(12) United States Patent
Wang

(10) Patent No.: US 10,278,185 B2
(45) Date of Patent: Apr. 30, 2019

(54) SIGNAL SENDING METHOD, USER EQUIPMENT, AND BASE STATION

(71) Applicant: Huawei Device Co., Ltd., Dongguan (CN)

(72) Inventor: Jian Wang, Beijing (CN)

(73) Assignee: HUAWEI DEVICE (DONGGUAN) CO., LTD., Dongguan (CN)

(*) Notice: Subject to any disclaimer, the term of this patent is extended or adjusted under 35 U.S.C. 154(b) by 153 days.

(21) Appl. No.: 14/907,652

(22) PCT Filed: Mar. 20, 2014

(86) PCT No.: PCT/CN2014/073800
§ 371 (c)(1),
(2) Date: Jan. 26, 2016

(87) PCT Pub. No.: WO2015/139278
PCT Pub. Date: Sep. 24, 2015

(65) Prior Publication Data
US 2016/0174231 A1 Jun. 16, 2016

(51) Int. Cl.
*H04W 72/04* (2009.01)
*H04W 52/04* (2009.01)
(Continued)

(52) U.S. Cl.
CPC ....... *H04W 72/0473* (2013.01); *H04W 52/04* (2013.01); *H04W 52/146* (2013.01);
(Continued)

(58) Field of Classification Search
CPC .................................. H04W 72/0473
See application file for complete search history.

(56) References Cited

U.S. PATENT DOCUMENTS

2009/0325625 A1 12/2009 Hugl et al.
2011/0039935 A1 2/2011 Pierzynowski
(Continued)

FOREIGN PATENT DOCUMENTS

CN 102264123 A 11/2011
CN 103209487 A 7/2013
(Continued)

OTHER PUBLICATIONS

Foreign Communication From a Counterpart Application, Korean Application No. 10-2016-7002127, Korean Office Action dated Aug. 10, 2017, 5 pages.
(Continued)

*Primary Examiner* — John D Blanton
(74) *Attorney, Agent, or Firm* — Conley Rose, P.C.

(57) ABSTRACT

A signal sending method, a user equipment, and a base station which may flexibly adjust a power for signal sending and improve network performance, is presented. The method includes determining, by a first user equipment, at least one first physical resource block (PRB) used to send a first signal, and determining, by the first user equipment according to a position of the at least one first PRB, a transmit power used by the first user equipment to send the first signal over the at least one first PRB, and sending, by the first user equipment, the first signal over the at least one first PRB using the transmit power.

4 Claims, 6 Drawing Sheets

(51) Int. Cl.
*H04W 52/14* (2009.01)
*H04W 52/36* (2009.01)
*H04W 52/28* (2009.01)
*H04W 52/38* (2009.01)

(52) U.S. Cl.
CPC ......... *H04W 52/28* (2013.01); *H04W 52/362* (2013.01); *H04W 52/367* (2013.01); *H04W 72/042* (2013.01); *H04W 52/383* (2013.01)

(56) References Cited

U.S. PATENT DOCUMENTS

| | | | |
|---|---|---|---|
| 2014/0369292 | A1 | 12/2014 | Wu et al. |
| 2016/0227493 | A1* | 8/2016 | Kwak ................... H04W 52/50 |
| 2017/0078974 | A1* | 3/2017 | Koutsimanis ....... H04W 52/146 |

FOREIGN PATENT DOCUMENTS

| | | | |
|---|---|---|---|
| CN | 103281768 | A | 9/2013 |
| CN | 103313395 | A | 9/2013 |
| EP | 2680647 | A2 | 1/2014 |
| EP | 3046373 | A1 | 7/2016 |
| JP | 2009017560 | A | 1/2009 |
| JP | 2012507975 | A | 3/2012 |
| JP | 2016536922 | A | 11/2016 |
| KR | 20100039874 | A | 4/2010 |
| KR | 20150030003 | A | 3/2015 |
| WO | 2013107277 | A1 | 7/2013 |
| WO | 2015037924 | A1 | 3/2015 |

OTHER PUBLICATIONS

Foreign Communication From a Counterpart Application, Korean Application No. 10-2016-7002127, English Translation of Korean Office Action dated Aug. 10, 2017, 3 pages.
Machine Translation and Abstract of Japanese Publication No. JPA200917560, Jan. 22, 2009, 24 pages.
Machine Translation and Abstract of Japanese Publication No. JPA2012507975, Mar. 29, 2012, 33 pages.
Machine Translation and Abstract of Japanese Publication No. JP2016536922, Nov. 24, 2016, 37 pages.
Foreign Communication From a Counterpart Application, Japanese Application No. 2016-532203, Japanese Office Action dated Feb. 14, 2017, 3 pages.
Foreign Communication From a Counterpart Application, Japanese Application No. 2016-532203, English Transaltion of Japanese Office Action dated Feb. 14, 2017, 4 pages.
Foreign Communication From a Counterpart Application, European Application No. 14886285.7, Extended European Search Report dated Aug. 22, 2016, 8 pages.
"3rd Generation Partnership Project; Technical Specification Group Radio Access Network; Evolved Uiversal Terrestrial Radio Access (E-UTRA); Physical channels and modulation (Release 12)," 3GPP TS 36.211, V12.0.0, Technical Specification, Dec. 2013, 120 pages.
Partial English Translation and Abstract of Chinese Patent Application No. CN102264123, Jan. 15, 2016, 7 pages.
"3rd Generation Partnership Project; Technical Specification Group Radio Access Network; Evolved Universal Terrestrial Radio Access (E-UTRA); Physical channels and modulation (Release 12)," 3GPP TS 36.211, V12.0.0, Technical Specification, Dec. 2013, 120 pages.
"3rd Generation Partnership Project; Technical Specification Group Radio Access Network; Evolved Universal Terrestrial Radio Access (E-UTRA); Multiplexing and channel coding (Release 12)," 3GPP TS 36.212, V12.0.0, Technical Specification, Dec. 2013, 88 pages.
"3rd Generation Partnership Project; Technical Specification Group Radio Access Network; Evolved Universal Terrestrial Radio Access (E-UTRA); Physical layer procedures (Release 12)," 3GPP TS 36.213, V12.0.0, Technical Specification, Dec. 2013, 186 pages.
Foreign Communication From A Counterpart Application, PCT Application No. PCT/CN2014/073800, English Translation of International Search Report dated Dec. 24, 2014, 2 pages.
Foreign Communication From A Counterpart Application, PCT Application No. PCT/CN2014/073800, Written Opinion dated Dec. 24, 2014, 5 pages.

* cited by examiner

SIGNAL SENDING METHOD, USER EQUIPMENT, AND BASE STATION

CROSS-REFERENCE TO RELATED APPLICATIONS

This application is a National Stage of International Application No. PCT/CN2014/073800, filed on Mar. 20, 2014, which is hereby incorporated by reference in its entirety.

TECHNICAL FIELD

The present disclosure relates to the communications field, and in particular, to a signal sending method, a user equipment, and a base station.

BACKGROUND

In an actual network, device-to-device (D2D) communication refers to direct communication between devices. In a D2D proximity service (D2D ProSe), for signal sending, signals are generally transmitted over different physical resource blocks using a same power. For example, when discovery signals are sent between D2D, the discovery signals are transmitted over different physical resource blocks using a maximum power. The uplink signals that are sent by a common user equipment are also generally transmitted using the same power.

Therefore, in the prior art, a transmit power of a signal cannot be flexibly adjusted, and consequently, sending of one signal may cause interference in another signal, thereby affecting performance of network communication.

SUMMARY

Embodiments of the present disclosure provide a signal sending method, a user equipment, and a base station, which can flexibly adjust a power for signal sending and improve network performance.

According to a first aspect, a signal sending method is provided, including determining, by a first user equipment, at least one first physical resource block (PRB) used to send a first signal, determining, by the first user equipment according to a position of the at least one first PRB, a transmit power used by the first user equipment to send the first signal over the at least one first PRB, and sending, by the first user equipment, the first signal over the at least one first PRB using the transmit power.

With reference to the first aspect, in a first implementation manner of the first aspect, the transmit power is a power less than or equal to a maximum transmit power used by the first user equipment to send the first signal over each PRB of the at least one first PRB, the maximum transmit power used by the first user equipment to send the first signal over each PRB of the at least one first PRB is determined by the first user equipment according to a candidate transmit power used by the first user equipment to send the first signal over each PRB of the at least one first PRB, and the candidate transmit power used by the first user equipment to send the first signal over each PRB of the at least one first PRB is determined by the first user equipment according to the position of the at least one first PRB and power information delivered by a base station.

With reference to the first possible implementation manner, in a second implementation manner, the power information includes power configuration information of the at least one first PRB and power control parameter information of the at least one first PRB, and the candidate transmit power used by the first user equipment to send the first signal over each PRB of the at least one first PRB is determined by the first user equipment according to a first power used by the first user equipment to send the first signal over each PRB of the at least one first PRB and a second power used by the first user equipment to send the first signal over each PRB of the at least one first PRB, where the first power is determined by the first user equipment according to the position of the at least one first PRB and the power configuration information of the at least one first PRB, and the second power is determined by the first user equipment according to the position of the at least one first PRB and the power control parameter information of the at least one first PRB.

With reference to the first possible implementation manner, in a third implementation manner, the power information includes power control parameter information of the first user equipment and power configuration information of the at least one first PRB, and the candidate transmit power used by the first user equipment to send the first signal over each PRB of the at least one first PRB is determined by the first user equipment according to a first power and a second power, where the first power is determined by the first user equipment according to the position of the at least one first PRB and the power configuration information of the at least one first PRB, and the second power is determined by the first user equipment according to the position of the at least one first PRB and the power control parameter information of the first user equipment.

With reference to the first possible implementation manner, in a fourth implementation manner, the power information includes power configuration information of the first user equipment and power control parameter information of the at least one first PRB, and the candidate transmit power used by the first user equipment to send the first signal over each PRB of the at least one first PRB is determined by the first user equipment according to a first power and a second power, where the first power is determined by the first user equipment according to the position of the at least one first PRB and the power configuration information of the first user equipment, and the second power is determined by the first user equipment according to the position of the at least one first PRB and the power control parameter information of the at least one first PRB.

With reference to any one of the second to the fourth possible implementation manners, in a fifth implementation manner, the candidate transmit power used by the first user equipment to send the first signal over each PRB of the at least one first PRB is a lower power between the first power and the second power.

With reference to any one of the second to the fourth possible implementation manners, in a sixth implementation manner, the candidate transmit power used by the first user equipment to send the first signal over each PRB of the at least one first PRB is a lowest power among the maximum transmit power supported by the first user equipment, the first power, and the second power.

With reference to the first possible implementation manner, in a seventh implementation manner, the power information includes power configuration information of the at least one first PRB, and the candidate transmit power used by the first user equipment to send the first signal over each PRB of the at least one first PRB is a first power, where the first power is determined by the first user equipment according to the position of the at least one first PRB and the power configuration information of the at least one first PRB, or the candidate transmit power used by the first user equipment to send the first signal over each PRB of the at least one first PRB is a lower power between the maximum transmit power supported by the first user equipment and a first power, where the first power is determined by the first user equipment according to the position of the at least one first PRB and the power configuration information of the at least one first PRB.

With reference to the first possible implementation manner, in an eighth implementation manner, the power information includes power control parameter information of the at least one first PRB, and the candidate transmit power used by the first user equipment to send the first signal over each PRB of the at least one first PRB is a second power, where the second power is determined by the first user equipment according to the position of the at least one first PRB and the power control parameter information of the at least one first PRB, or the candidate transmit power used by the first user equipment to send the first signal over each PRB of the at least one first PRB is a lower power between the maximum transmit power supported by the first user equipment and a second power, where the second power is determined by the first user equipment according to the position of the at least one first PRB and the power control parameter information of the at least one first PRB.

With reference to any one of the second, the fourth, the fifth, the sixth, and the eighth implementation manners, in a ninth possible implementation manner, the power control parameter information includes at least one of $P_O(j)$, $f(j)$, and $\alpha(j)$, where j is a position number of a PRB, $P_O(j)$ is a target receive power threshold configured by a system to receive a discovery signal over the (j)th PRB, $f(j)$ is a power control parameter and used to control a power increment value used by a user equipment to send a signal over the (j)th PRB, and $\alpha(j) \in [0,1]$ is a path loss compensation coefficient configured by the system to send a signal over the (j)th PRB.

With reference to the ninth possible implementation manner, in a tenth possible implementation manner, the second power is determined by the first user equipment according to the following formula:

$$P(j)=(P_O(j)+\alpha(j) \cdot PL+f(j))[dBm],$$

where P(j) is a maximum transmit power used by the user equipment to send a signal over the (j)th PRB, and PL is a path loss between the base station and the user equipment. The maximum transmit power P(j) may be expressed in decibel-milliwatts (dBm).

With reference to any one of the second, the third, the fifth, the sixth, and the seventh implementation manners, in an eleventh possible implementation manner, the power configuration information includes a power corresponding to each PRB of the at least one first PRB, where the first power is determined by the first user equipment according to the position of the at least one first PRB and the power corresponding to each PRB of the at least one first PRB.

With reference to any one of the second, the third, the fifth, the sixth, and the seventh implementation manners, in a twelfth possible implementation manner, the power configuration information includes a reference transmit power and an offset value corresponding to each PRB of the at least one first PRB, and the first power is determined by the first user equipment according to the position of the at least one first PRB, the reference transmit power, and the offset value corresponding to each PRB of the at least one first PRB.

With reference to any one of the second, the third, the fifth, the sixth, and the seventh implementation manners, in a thirteen possible implementation manner, the power configuration information includes at least an offset value corresponding to each PRB of the at least one first PRB, and the first power is determined by the first user equipment according to the position of the at least one first PRB, the maximum transmit power supported by the first user equipment, and the offset value corresponding to each PRB of the at least one first PRB.

With reference to the first aspect, in a fourteenth possible implementation manner, the transmit power is a power less than or equal to a maximum transmit power used to send the first signal over each PRB of the at least one first PRB, the maximum transmit power used by the first user equipment to send the first signal over each PRB of the at least one first PRB is determined by the first user equipment according to a candidate transmit power used by the first user equipment to send the first signal over each PRB of the at least one first PRB, and the candidate transmit power used by the first user equipment to send the first signal over each PRB of the at least one first PRB is determined by the first user equipment according to preconfigured information, where the preconfigured information indicates the candidate transmit power corresponding to each PRB of the at least one first PRB.

With reference to the first aspect, in a fifteenth possible implementation manner, the transmit power is determined by the first user equipment according to the position of the at least one first PRB and power information delivered by a base station, where the power information includes the transmit power used by the first user equipment to send the first signal over each PRB of the at least one first PRB.

With reference to the first to the fourteenth possible implementation manners, in a sixteenth possible implementation manner, the at least one first PRB is one PRB, and the maximum transmit power used by the first user equipment to send the first signal over each PRB of the at least one first PRB is the candidate transmit power used by the first user equipment to send the first signal over each PRB of the at least one first PRB.

With reference to the first to the fourteenth possible implementation manners, in a seventeenth possible implementation manner, the at least one first PRB are at least two PRBs, and the maximum transmit power used by the first user equipment to send the first signal over each PRB of the at least one first PRB is determined by the first user equipment according to at least one candidate transmit power used by the first user equipment to send the first signal over the at least one first PRB.

With reference to the seventeenth possible implementation manner, in an eighteenth possible implementation manner, the maximum transmit power used by the first user equipment to send the first signal over each PRB of the at least one first PRB is a lowest power among the at least one candidate transmit power used by the first user equipment to send the first signal over the at least one first PRB.

With reference to the first to the eighteenth possible implementation manners, in a nineteenth possible implementation manner, the first signal is any one of a D2D discovery signal, a D2D direct communication signal, a physical uplink control channel (PUCCH) signal from a user equipment to a base station, and a physical uplink shared channel (PUSCH) signal from a user equipment to a base station.

According to a second aspect, a signal sending method is provided, including determining, by a base station according to a position of at least one first PRB, power information, where the power information is used to instruct a first user equipment to determine, according to the power information, a transmit power used by the first user equipment to send a first signal over the at least one first PRB, and sending the power information, by the base station, to the first user equipment.

With reference to the second aspect, in a first possible implementation manner, the power information includes at least one of power configuration information of the at least one first PRB and power control parameter information of the at least one first PRB.

With reference to the second aspect, in a second possible implementation manner, the power information includes the transmit power used by the first user equipment to send the first signal over the at least one first PRB, and the method further includes determining, by the base station according to at least one of power configuration information of the at least one first PRB and power control parameter information of the at least one first PRB, a candidate transmit power used by the first user equipment to send the first signal over the at least one first PRB, and determining, by the base station according to the candidate transmit power used by the first user equipment to send the first signal over the at least one first PRB, a maximum transmit power used by the first user equipment to send the first signal over each PRB of the at least one first PRB.

With reference to the second possible implementation manner of the second aspect, in a third possible implementation manner, the candidate transmit power used by the first user equipment to send the first signal over each PRB of the at least one first PRB is determined by the base station according to a first power used by the first user equipment to send the first signal over each PRB of the at least one first PRB and a second power used by the first user equipment to send the first signal over each PRB of the at least one first PRB, where the first power is determined by the base station according to the power configuration information of the at least one first PRB, and the second power is determined by the base station according to the power control parameter information of the at least one first PRB.

With reference to the third possible implementation manner of the second aspect, in a fourth possible implementation manner, the candidate transmit power used by the first user equipment to send the first signal over each PRB of the at least one first PRB is a lower power between the first power and the second power.

With reference to the third possible implementation manner of the second aspect, in a fifth possible implementation manner, the candidate transmit power used by the first user equipment to send the first signal over each PRB of the at least one first PRB is a lowest power among the maximum transmit power supported by the first user equipment, the first power, and the second power.

With reference to the second possible implementation manner of the second aspect, in a sixth possible implementation manner, the candidate transmit power used by the first user equipment to send the first signal over each PRB of the at least one first PRB is a first power, where the first power is determined by the base station according to the power configuration information of the at least one first PRB, or the candidate transmit power used by the first user equipment to send the first signal over each PRB of the at least one first PRB is a lower power between the maximum transmit power supported by the first user equipment and a first power, where the first power is determined by the base station according to the power configuration information of the at least one first PRB.

With reference to the second possible implementation manner of the second aspect, in a seventh possible implementation manner, the candidate transmit power used by the first user equipment to send the first signal over each PRB of the at least one first PRB is a second power, where the second power is determined by the base station according to the power control parameter information of the at least one first PRB, or the candidate transmit power used by the first user equipment to send the first signal over each PRB of the at least one first PRB is a lower power between the maximum transmit power supported by the first user equipment and a second power, where the second power is determined by the base station according to the power control parameter information of the at least one first PRB.

With reference to any one of the first to the seventh possible implementation manners of the second aspect, in an eighth possible implementation manner, the power control parameter information includes at least one of $P_O(j)$, $f(j)$, and $\alpha(j)$, where j is a position number of a PRB, $P_O(j)$ is a target receive power threshold configured by a system to receive a discovery signal over the (j)th PRB, $\alpha(j) \in [0,1]$ is a path loss compensation coefficient configured by the system to send a signal over the (j)th PRB, and $f(j)$ is a power control parameter and used to control a power increment value used by a user equipment to send a signal over the (j)th PRB.

With reference to any one of the first to the eighth possible implementation manners of the second aspect, in a ninth possible implementation manner, the power configuration information includes one of the following items: a power corresponding to each PRB of the at least one first PRB, a reference transmit power and an offset value corresponding to each PRB of the at least one first PRB, and the offset value corresponding to each PRB of the at least one first PRB.

With reference to any one of the second to the ninth possible implementation manners of the second aspect, in a tenth possible implementation manner, the at least one first PRB is one PRB, and the maximum transmit power used by the first user equipment to send the first signal over each PRB of the at least one first PRB is the candidate transmit power used by the first user equipment to send the first signal over each PRB of the at least one first PRB.

With reference to any one of the second to the tenth possible implementation manners of the second aspect, in an eleventh possible implementation manner, the at least one first PRB are at least two PRBs, and the maximum transmit power used by the first user equipment to send the first signal over each PRB of the at least one first PRB is determined by the base station according to at least one candidate transmit power used by the first user equipment to send the first signal over the at least one first PRB.

With reference to the eleventh possible implementation manner of the second aspect, in a twelfth possible implementation manner, the maximum transmit power used by the first user equipment to send the first signal over each PRB of the at least one first PRB is a lowest power among the at least one candidate transmit power used by the first user equipment to send the first signal over the at least one first PRB.

With reference to the second aspect or any one of the first to the twelfth possible implementation manners of the second aspect, in a thirteen possible implementation manner, the first signal is any one of a D2D discovery signal, a D2D direct communication signal, a PUCCH signal from a user equipment to a base station, and a PUSCH signal from a user equipment to a base station.

According to a third aspect, a user equipment is provided, including, a first determining unit configured to send at least one first PRB of a first signal, a second determining unit configured to determine, according to a position of the at least one first PRB, a transmit power used by the user equipment to send the first signal over the at least one first PRB, and a sending unit configured to send the first signal over the at least one first PRB using the transmit power.

With reference to the third aspect, in a first possible implementation manner, the transmit power is a power less than or equal to a maximum transmit power used by the user equipment to send the first signal over each PRB of the at least one first PRB, the maximum transmit power used by the user equipment to send the first signal over each PRB of the at least one first PRB is determined by the user equipment according to a candidate transmit power used by the user equipment to send the first signal over each PRB of the at least one first PRB, and the candidate transmit power used by the user equipment to send the first signal over each PRB of the at least one first PRB is determined by the user equipment according to the position of the at least one first PRB and power information delivered by a base station.

With reference to the third aspect, in a second possible implementation manner, the power information includes power configuration information of the at least one first PRB and power control parameter information of the at least one first PRB, and the candidate transmit power used by the user equipment to send the first signal over each PRB of the at least one first PRB is determined by the user equipment according to a first power used by the user equipment to send the first signal over each PRB of the at least one first PRB and a second power used by the user equipment to send the first signal over each PRB of the at least one first PRB, where the first power is determined by the user equipment according to the position of the at least one first PRB and the power configuration information of the at least one first PRB, and the second power is determined by the user equipment according to the position of the at least one first PRB and the power control parameter information of the at least one first PRB.

With reference to the first possible implementation manner of the third aspect, in a third possible implementation manner, the power information includes power control parameter information of the user equipment and power configuration information of the at least one first PRB, and the candidate transmit power used by the user equipment to send the first signal over each PRB of the at least one first PRB is determined by the user equipment according to a first power and a second power, where the first power is determined by the user equipment according to the position of the at least one first PRB and the power configuration information of the at least one first PRB, and the second power is determined by the user equipment according to the position of the at least one first PRB and the power control parameter information of the user equipment.

With reference to the first possible implementation manner of the third aspect, in a fourth possible implementation manner, the power information includes power configuration information of the user equipment and power control parameter information of the at least one first PRB, and the candidate transmit power used by the user equipment to send the first signal over each PRB of the at least one first PRB is determined by the user equipment according to a first power and a second power, where the first power is determined by the user equipment according to the position of the at least one first PRB and the power configuration information of the user equipment, and the second power is determined by the user equipment according to the position of the at least one first PRB and the power control parameter information of the at least one first PRB.

With reference to any one of the second to the fourth possible implementation manners of the third aspect, in a fifth implementation manner, the candidate transmit power used by the user equipment to send the first signal over each PRB of the at least one first PRB is a lower power between the first power and the second power.

With reference to any one of the second to the fourth possible implementation manners of the third aspect, in a sixth implementation manner, the candidate transmit power used by the user equipment to send the first signal over each PRB of the at least one first PRB is a lowest power among the maximum transmit power supported by the user equipment, the first power, and the second power.

With reference to the first possible implementation manner of the third aspect, in a seventh implementation manner, the power information includes power configuration information of the at least one first PRB, and the candidate transmit power used by the user equipment to send the first signal over each PRB of the at least one first PRB is a first power, where the first power is determined by the user equipment according to the position of the at least one first PRB and the power configuration information of the at least one first PRB, or the candidate transmit power used by the user equipment to send the first signal over each PRB of the at least one first PRB is a lower power between the maximum transmit power supported by the user equipment and a first power, where the first power is determined by the user equipment according to the position of the at least one first PRB and the power configuration information of the at least one first PRB.

With reference to the first possible implementation manner of the third aspect, in an eighth implementation manner, the power information includes power control parameter information of the at least one first PRB, and the candidate transmit power used by the user equipment to send the first signal over each PRB of the at least one first PRB is a second power, where the second power is determined by the user equipment according to the position of the at least one first PRB and the power control parameter information of the at least one first PRB, or, the candidate transmit power used by the user equipment to send the first signal over each PRB of the at least one first PRB is a lower power between the maximum transmit power supported by the user equipment and a second power, where the second power is determined by the user equipment according to the position of the at least one first PRB and the power control parameter information of the at least one first PRB.

With reference to any one of the second, the fourth, the fifth, the sixth, and the eighth implementation manners of the third aspect, in a ninth possible implementation manner, the power control parameter information includes at least one of $P_O(j)$, $f(j)$, and $\alpha(j)$, where j is a position number of a PRB, $P_O(j)$ is a target receive power threshold configured by a system to receive a discovery signal over the (j)th PRB, $f(j)$ is a power control parameter and used to control a power increment value used by a user equipment to send a signal over the (j)th PRB, and $\alpha(j) \in [0,1]$ is a path loss compensation coefficient configured by the system to send a signal over the (j)th PRB.

With reference to the ninth possible implementation manner, in a tenth possible implementation manner, the second power is determined by the user equipment according to the following formula:

$$P(j) = (P_O(j) + \alpha(j) \cdot PL + f(j))[dBm],$$

where P(j) is a maximum transmit power used by the user equipment to send a signal over the (j)th PRB, and PL is a path loss between the base station and the user equipment.

With reference to any one of the second, the third, the fifth, the sixth, and the seventh implementation manners of the third aspect, in an eleventh possible implementation manner, the power configuration information includes a power corresponding to each PRB of the at least one first PRB, where the first power is determined by the user equipment according to the position of the at least one first PRB and the power corresponding to each PRB of the at least one first PRB.

With reference to any one of the second, the third, the fifth, the sixth, and the seventh implementation manners of the third aspect, in a twelfth possible implementation manner, the power configuration information includes a reference transmit power and an offset value corresponding to each PRB of the at least one first PRB, and the first power is determined by the user equipment according to the position of the at least one first PRB, the reference transmit power, and the offset value corresponding to each PRB of the at least one first PRB.

With reference to any one of the second, the third, the fifth, the sixth, and the seventh implementation manners of the third aspect, in a thirteen possible implementation manner, the power configuration information includes an offset value corresponding to each PRB of the at least one first PRB, and the first power is determined by the user equipment according to the position of the at least one first PRB, the maximum transmit power supported by the user equipment, and the offset value corresponding to each PRB of the at least one first PRB.

With reference to the third aspect, in a fourteenth possible implementation manner, the transmit power is a power less than or equal to a maximum transmit power used to send the first signal over each PRB of the at least one first PRB, the maximum transmit power used by the user equipment to send the first signal over each PRB of the at least one first PRB is determined by the user equipment according to a candidate transmit power used by the user equipment to send the first signal over each PRB of the at least one first PRB, and the candidate transmit power used by the user equipment to send the first signal over each PRB of the at least one first PRB is determined by the user equipment according to preconfigured information, where the preconfigured information indicates the candidate transmit power corresponding to each PRB of the at least one first PRB.

With reference to the third aspect, in a fifteenth possible implementation manner, the transmit power is determined by the user equipment according to the position of the at least one first PRB and power information delivered by a base station, where the power information includes the transmit power used by the user equipment to send the first signal over each PRB of the at least one first PRB.

With reference to the first to the fourteenth possible implementation manners of the third aspect, in a sixteenth possible implementation manner, the at least one first PRB is one PRB, and the maximum transmit power used by the user equipment to send the first signal over each PRB of the at least one first PRB is the candidate transmit power used by the user equipment to send the first signal over each PRB of the at least one first PRB.

With reference to the first to the fourteenth possible implementation manners of the third aspect, in a seventeenth possible implementation manner, the at least one first PRB are at least two PRBs, and the maximum transmit power used by the user equipment to send the first signal over each PRB of the at least one first PRB is determined by the user equipment according to at least one candidate transmit power used by the user equipment to send the first signal over the at least one first PRB.

With reference to the seventeenth possible implementation manner of the third aspect, in an eighteenth possible implementation manner, the maximum transmit power used by the user equipment to send the first signal over each PRB of the at least one first PRB is a lowest power among the at least one candidate transmit power used by the user equipment to send the first signal over the at least one first PRB.

With reference to the first to the eighteenth possible implementation manners of the third aspect, in a nineteenth possible implementation manner, the first signal is any one of a D2D discovery signal, a D2D direct communication signal, a PUCCH signal from a user equipment to a base station, and a PUSCH signal from a user equipment to a base station.

According to a fourth aspect, a base station is provided, including, a first determining unit configured to determine power information according to a position of at least one first PRB, where the power information is used to instruct a first user equipment to determine, according to the power information, a transmit power used by the first user equipment to send a first signal over the at least one first PRB, and a sending unit configured to send the power information to the first user equipment.

With reference to the fourth aspect, in a first possible implementation manner, the power information includes at least one of power configuration information of the at least one first PRB and power control parameter information of the at least one first PRB.

With reference to the fourth aspect, in a second possible implementation manner, the power information includes the transmit power used by the first user equipment to send the first signal over the at least one first PRB, and the base station further includes, a second determining unit configured to determine, according to at least one of power configuration information of the at least one first PRB and power control parameter information of the at least one first PRB, a candidate transmit power used by the first user equipment to send the first signal over the at least one first PRB, and a third determining unit configured to determine, according to the candidate transmit power used by the first user equipment to send the first signal over the at least one first PRB, a maximum transmit power used by the first user equipment to send the first signal over each PRB of the at least one first PRB.

With reference to the second possible implementation manner of the fourth aspect, in a third possible implementation manner, the candidate transmit power used by the first user equipment to send the first signal over each PRB of the at least one first PRB is determined by the base station according to a first power used by the first user equipment to send the first signal over each PRB of the at least one first PRB and a second power used by the first user equipment to send the first signal over each PRB of the at least one first PRB, where the first power is determined by the base station according to the power configuration information of the at least one first PRB, and the second power is determined by the base station according to the power control parameter information of the at least one first PRB.

With reference to the third possible implementation manner of the fourth aspect, in a fourth possible implementation manner, the candidate transmit power used by the first user equipment to send the first signal over each PRB of the at least one first PRB is a lower power between the first power and the second power.

With reference to the third possible implementation manner of the fourth aspect, in a fifth possible implementation manner, the candidate transmit power used by the first user equipment to send the first signal over each PRB of the at least one first PRB is a lowest power among the maximum transmit power supported by the first user equipment, the first power, and the second power.

With reference to the second possible implementation manner of the fourth aspect, in a sixth possible implementation manner, the candidate transmit power used by the first user equipment to send the first signal over each PRB of the at least one first PRB is a first power, where the first power is determined by the base station according to the power configuration information of the at least one first PRB, or the candidate transmit power used by the first user equipment to send the first signal over each PRB of the at least one first PRB is a lower power between the maximum transmit power supported by the first user equipment and a first power, where the first power is determined by the base station according to the power configuration information of the at least one first PRB.

With reference to the second possible implementation manner of the fourth aspect, in a seventh possible implementation manner, the candidate transmit power used by the first user equipment to send the first signal over each PRB of the at least one first PRB is a second power, where the second power is determined by the base station according to the power control parameter information of the at least one first PRB or the candidate transmit power used by the first user equipment to send the first signal over each PRB of the at least one first PRB is a lower power between the maximum transmit power supported by the first user equipment and a second power, where the second power is determined by the base station according to the power control parameter information of the at least one first PRB.

With reference to any one of the first to the seventh possible implementation manners of the fourth aspect, in an eighth possible implementation manner, the power control parameter information includes at least one of $P_O(j)$, $f(j)$, and $\alpha(j)$, where j is a position number of a PRB, $P_O(j)$ is a target receive power threshold configured by a system to receive a discovery signal over the (j)th PRB, $\alpha(j) \in [0,1]$ is a path loss compensation coefficient configured by the system to send a signal over the (j)th PRB, and $f(j)$ is a power control parameter and used to control a power increment value used by a user equipment to send a signal over the (j)th PRB.

With reference to any one of the first to the eighth possible implementation manners of the fourth aspect, in a ninth possible implementation manner, the power configuration information includes one of the following items: a power corresponding to each PRB of the at least one first PRB, a reference transmit power and an offset value corresponding to each PRB of the at least one first PRB, and the offset value corresponding to each PRB of the at least one first PRB.

With reference to any one of the second to the ninth possible implementation manners of the fourth aspect, in a tenth possible implementation manner, the at least one first PRB is one PRB, and the maximum transmit power used by the first user equipment to send the first signal over each PRB of the at least one first PRB is the candidate transmit power used by the first user equipment to send the first signal over each PRB of the at least one first PRB.

With reference to any one of the second to the tenth possible implementation manners of the fourth aspect, in an eleventh possible implementation manner, the at least one first PRB are at least two PRBs, and the maximum transmit power used by the first user equipment to send the first signal over each PRB of the at least one first PRB is determined by the base station according to at least one candidate transmit power used by the first user equipment to send the first signal over the at least one first PRB.

With reference to the eleventh possible implementation manner of the fourth aspect, in a twelfth possible implementation manner, the maximum transmit power used by the first user equipment to send the first signal over each PRB of the at least one first PRB is a lowest power among the at least one candidate transmit power used by the first user equipment to send the first signal over the at least one first PRB.

With reference to the fourth aspect or any one of the first to the twelfth possible implementation manners of the second aspect, in a thirteen possible implementation manner, the first signal is any one of a D2D discovery signal, a D2D direct communication signal, a PUCCH signal from a user equipment to a base station, and a PUSCH signal from a user equipment to a base station.

Based on the foregoing technical solutions, in the embodiments of the present disclosure, a first user equipment may determine at least one first physical resource block used to send a first signal, determine, according to a position of the at least one first PRB, a transmit power used to send the first signal over the at least one first PRB, and send the first signal over the at least one first PRB using the transmit power. Therefore, a transmit power of a signal can be flexibly adjusted, and network performance is improved.

BRIEF DESCRIPTION OF DRAWINGS

To describe the technical solutions in the embodiments of the present disclosure more clearly, the following briefly introduces the accompanying drawings required for describing the embodiments of the present disclosure. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. The described embodiments are a part rather than all of the embodiments of the present disclosure. All other embodiments obtained by a person of ordinary skill in the art based on the embodiments of the present disclosure without creative efforts shall fall within the protection scope of the present disclosure.

It should be understood that the technical solutions of the embodiments of the present disclosure may be applied to various communications systems, such as: a global system for mobile communications (GSM) system, a code division multiple access (CDMA) system, a wideband code division multiple access (WCDMA) system, a general packet radio service (GPRS), a long term evolution (LTE) system, a LTE frequency division duplex (FDD) system, a LTE time division duplex (TDD), a universal mobile telecommunication system (UMTS), and a worldwide interoperability for microwave access (WiMAX) communications system.

The embodiments of the present disclosure may be used in radio networks with different standards. A radio access network may include different network elements in different systems. For example, network elements on the radio access network in the LTE and LTE-Advanced include an evolved NodeB (eNB), and network elements on the radio access network in the WCDMA include a radio network controller (RNC) and a NodeB. Similarly, other radio networks such as the WiMAX may also use solutions similar to those in the embodiments of the present disclosure, and the only difference is that the related modules in the base station system may be different. No limitation is set by the embodiments of the present disclosure. However, for ease of description, the following embodiments are described using an eNodeB and NodeB as an example.

It should further be understood that in the embodiments of the present disclosure, a user equipment (UE) includes but is not limited to a mobile station (MS), a mobile terminal, a mobile telephone, a handset, a portable equipment, and the like. The user equipment may communicate with one or more core networks using a radio access network (RAN). For example, the user equipment may be a mobile telephone (or referred to as a "cellular" telephone), a computer having a wireless communication function, or the like. The user equipment may further be a portable, pocket-sized, handheld, computer built-in, or in-vehicle mobile apparatus.

Figure 1:
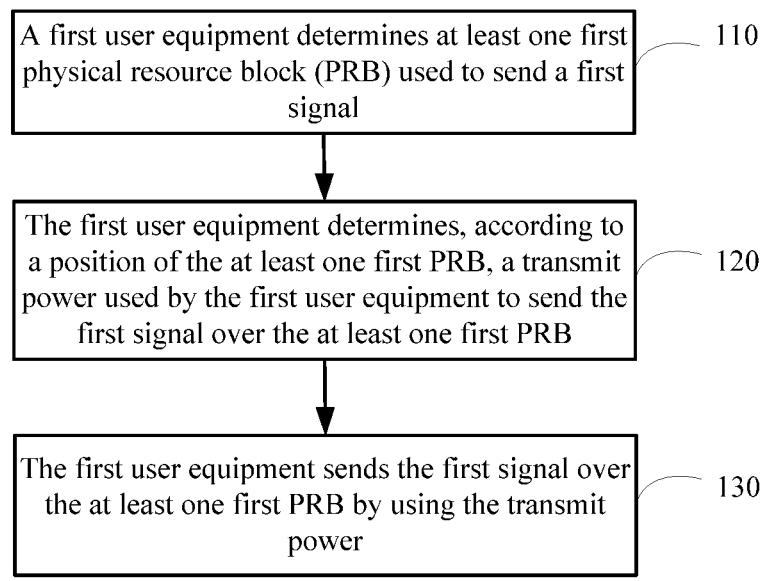
FIG. 1 is a schematic flowchart of a signal sending method according to an embodiment of the present disclosure.

FIG. 1 is a schematic flowchart of a signal sending method according to an embodiment of the present disclosure. As shown in FIG. 1, the method includes the following steps:

110: A first user equipment determines at least one first PRB used to send a first signal.

Furthermore, the first user equipment may determine, according to scheduling information of a base station, the at least one first PRB used to send the first signal, which is not limited by the embodiment of the present disclosure. For example, the first user equipment may also determine, according to a resource utilization condition, the at least one first PRB used to send the first signal, or may determine, according to pre-configuration, the at least one first PRB used to send the first signal.

120: The first user equipment determines, according to a position of the at least one first PRB, a transmit power used by the first user equipment to send the first signal over the at least one first PRB.

Furthermore, the first user equipment may determine, according to an absolute position, of the foregoing at least one first PRB, in a time-frequency resource, the transmit power used by the first user equipment to send the first signal over the at least one first PRB. For example, the first user equipment may determine, according to an index number, of the foregoing at least one first PRB, in the time-frequency resource, the transmit power used by the first user equipment to send the first signal over the at least one first PRB. Alternatively, the first user equipment may also determine, according to a relative position, of the foregoing at least one first PRB, in a time-frequency resource, the transmit power used by the first user equipment to send the first signal over the at least one first PRB. For example, the first user equipment may determine, according to a position of the at least one first PRB relative to a PRB used to send a second signal, to determine the transmit power used by the first user equipment to send the first signal over the at least one first PRB.

130: The first user equipment sends the first signal over the at least one first PRB using the transmit power.

Therefore, in the embodiment of the present disclosure, a first user equipment may determine at least one first physical resource block PRB used to send a first signal, determine, according to a position of the at least one first PRB, a transmit power used to send the first signal over the at least one first PRB, and send the first signal over the at least one first PRB using the transmit power. In the embodiment of the present disclosure, a transmit power of a signal can be adjusted according to a position of a PRB used to send the signal, so that a specific transmit power can be set in a specific time-frequency resource position according to a performance requirement of network communication, and the transmit power of the signal can be flexibly adjusted, thereby improving performance of network communication.

It should be understood that the transmit power is a power in an actual application and may be a power greater than or less than a maximum transmit power.

It should be understood that, in the embodiment of the present disclosure, the at least one first PRB may be one PRB, or may be multiple PRBs, for example, two, three, five, or ten PRBs, or may further be one or more physical resource block pairs (PRB Pair), which is not limited by the embodiment of the present disclosure.

According to the embodiment of the present disclosure, the first signal may be a discovery signal in D2D, or may be a direct communication signal in D2D, or may further be an uplink signal sent by the first user equipment to the base station. Furthermore, the uplink signal sent by the user equipment to the base station may be a PUCCH signal from a user equipment to a base station, or a PUSCH signal from a user equipment to a base station, which is not limited by the embodiment of the present disclosure.

It should be understood that the first user equipment may determine, according to power information sent by the base station, the transmit power used by the first user equipment to send the first signal over the at least one first PRB, or the first user equipment may determine, according to preconfigured information, the transmit power used by the first user equipment to send the first signal over the at least one first PRB.

The following describes in detail a process in which the first user equipment determines, according to the power information sent by the base station, the transmit power used by the first user equipment to send the first signal over the at least one first PRB.

Correspondingly, as another embodiment, when the first user equipment determines, according to a message sent by the base station, the transmit power used by the first user equipment to send the first signal over the at least one first PRB, in step 120, the transmit power is a power less than or equal to a maximum transmit power used by the first user equipment to send the first signal over each PRB of the at least one first PRB, the maximum transmit power used by the first user equipment to send the first signal over each PRB of the at least one first PRB is determined by the first user equipment according to a candidate transmit power used by the first user equipment to send the first signal over each PRB of the at least one first PRB, and the candidate transmit power used by the first user equipment to send the first signal over each PRB of the at least one first PRB is determined by the first user equipment according to the position of the at least one first PRB and power information delivered by the base station.

Figure 2:
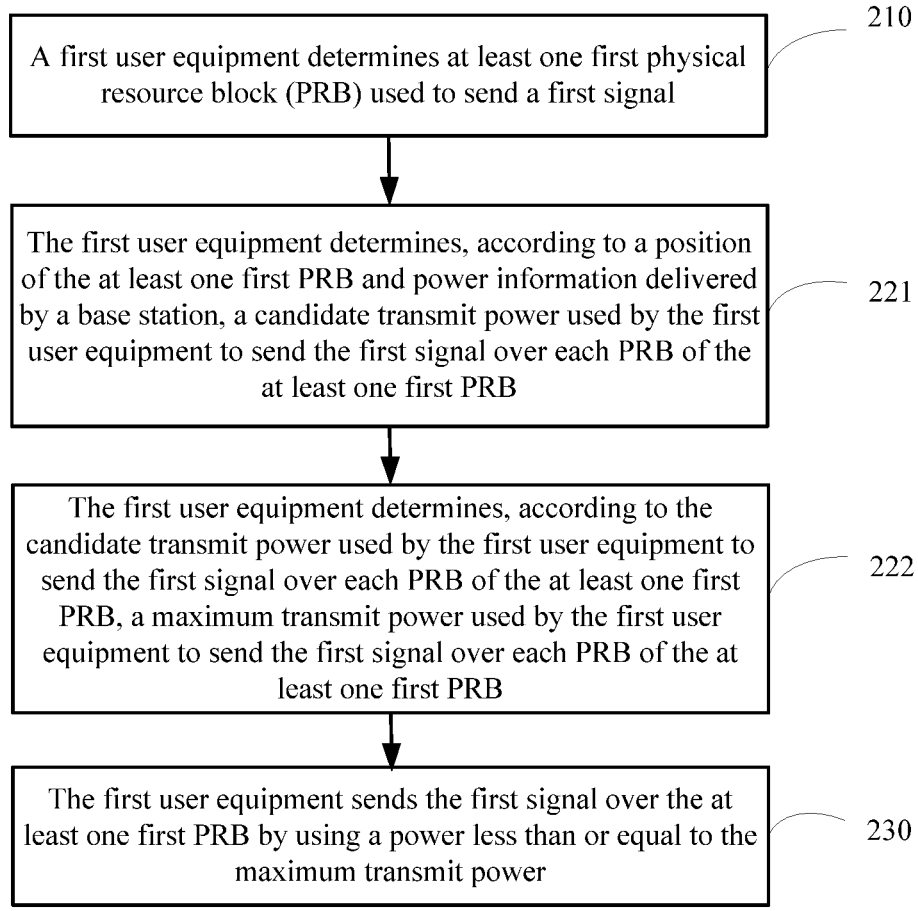
FIG. 2 is a schematic flowchart of a signal sending method according to another embodiment of the present disclosure.

FIG. 2 is a schematic flowchart of a signal sending method according to another embodiment of the present disclosure.

As shown in FIG. 2, the method includes the following steps:

210: A first user equipment determines at least one first physical resource block (PRB) used to send a first signal.

221: The first user equipment determines, according to a position of the at least one first PRB and power information delivered by a base station, a candidate transmit power used by the first user equipment to send the first signal over each PRB of the at least one first PRB.

222: The first user equipment determines, according to the candidate transmit power used by the first user equipment to send the first signal over each PRB of the at least one first PRB, a maximum transmit power used by the first user equipment to send the first signal over each PRB of the at least one first PRB.

230: The first user equipment sends the first signal over the at least one first PRB using a power less than or equal to the maximum transmit power.

It should be noted that step 210 in FIG. 2 corresponds to step 110 in FIG. 1, and step 230 corresponds to step 130 in FIG. 1. To avoid repetition, details are not described herein again.

It should be understood that the transmit power in step 130 in FIG. 1 may be a transmit power in an actual application and may be a power less than or equal to the maximum transmit power. The maximum transmit power in step 222 is a maximum value of the transmit power. That is, in an actual application, the transmit power may be equal to the maximum transmit power, or may be less than the maximum transmit power.

Furthermore, the first user equipment receives a message delivered by the base station, and determines the power information according to the message delivered by the base station, where the power information is determined by the base station according to a position of the at least one first PRB. The first user equipment determines, according to the power information, the transmit power used by the first user equipment to send the first signal over the at least one first PRB, so that interference caused by the first signal in a second signal that is sent over a second PRB is lower than a preset level. A shorter distance between the first PRB and the second PRB causes a lower transmit power used to send the first signal over the first PRB. In other words, the base station may determine the message according to the distance between the first PRB and the second PRB, and the first user equipment determines the power information according to the message.

It should be understood that the second signal may be a discovery signal in D2D, or may be a direct communication signal in D2D, or may further be an uplink signal sent by the first user equipment or a second user equipment to the base station, which is not limited by the embodiment of the present disclosure. Furthermore, when the first signal is a discovery signal or a direct communication signal in D2D, the second signal may be an uplink signal sent by the user equipment to the base station. When the first signal is an uplink signal sent by the user equipment to the base station, the second signal may be a discovery signal or a direct communication signal in D2D. The uplink signal sent by the user equipment to the base station may be a PUCCH signal from a user equipment to a base station, or a PUSCH signal from a user equipment to a base station, which is not limited by the embodiment of the present disclosure.

It should be understood that the first user equipment may determine the power information by receiving one or more messages delivered by the base station. In other words, the foregoing power information may be carried in one message, which is not limited in the embodiment of the present disclosure, for example, the power information may also be carried in multiple messages.

Therefore, in the embodiment of the present disclosure, a power used by a user equipment to send a first signal over at least one first PRB can be determined according to a position of the at least one first PRB used to send the first signal, and the first signal is sent over the at least one first PRB according to the transmit power. In the embodiment of the present disclosure, a transmit power of a signal can be adjusted according to a position of a PRB used to send the signal, so that a transmit power of a PRB of a first signal can be set according to a distance between the PRB used to send the first signal and a PRB used to send a second signal, and the transmit power of the signal can be flexibly adjusted to reduce interference between the first signal and the second signal. In other words, in the embodiment of the present disclosure, a transmit power used to send a signal over a first PRB may be determined according to a position of the first PRB relative to a second PRB. A shorter distance between the first PRB and the second PRB causes a lower transmit power used to send the first signal over the first PRB, thereby reducing interference caused by the first signal, which is sent over the first PRB, in the second signal sent over the second PRB, and improving performance of network communication.

It should be understood that the second signal may be sent by the first user equipment, or may be sent by the second user equipment. It should also be understood that the second PRB may be one PRB, or may be multiple PRBs, for example, two, three, five, or ten PRBs, or may further be one or more PRB Pairs. That is, the second signal may be sent by occupying one PRB, or may be sent by occupying multiple PRBs, which is not limited by the embodiment of the present disclosure.

According to the embodiment of the present disclosure, the foregoing power information may include power control parameter information of the first user equipment and power configuration information of the at least one first PRB. The candidate transmit power used by the first user equipment to send the first signal over each PRB of the at least one first PRB is determined by the first user equipment according to a first power and a second power, where the first power is determined by the first user equipment according to the position of the at least one first PRB and the power configuration information of the at least one first PRB, and the second power is determined by the first user equipment according to the position of the at least one first PRB and the power control parameter information of the first user equipment. It should be understood that the power control parameter information may be unrelated to a position of a PRB.

Alternatively, as another embodiment, the power information includes power configuration information of the first user equipment and power control parameter information of the at least one first PRB, and the candidate transmit power used by the first user equipment to send the first signal over each PRB of the at least one first PRB is determined by the first user equipment according to a first power and a second power, where the first power is determined by the first user equipment according to the position of the at least one first PRB and the power configuration information of the first user equipment, and the second power is determined by the first user equipment according to the position of the at least one first PRB and the power control parameter information of the at least one first PRB. It should be understood that the power configuration information may be unrelated to a position of a PRB.

Alternatively, as another embodiment, the power information may include at least one of power configuration information of the at least one first PRB and power control parameter information of the at least one first PRB. That is, the power information may include only the power configuration information of the at least one first PRB, or may include only the power control parameter information of the at least one first PRB, or may further include both the power configuration information of the at least one first PRB and the power control parameter information of the at least one first PRB. Correspondingly, the first user equipment may determine, according to at least one of the power configuration information of the at least one first PRB and the power control parameter information of the at least one first PRB, the candidate transmit power used by the first user equipment to send the first signal over the at least one first PRB.

It should be understood that, in the embodiment of the present disclosure, the power configuration information of the at least one first PRB and the power control parameter information of the at least one first PRB may be sent using one message, or may also be sent using two or more different messages, which is not limited by the embodiment of the present disclosure.

The following separately describes a case in which the power information includes only the power configuration information of the at least one first PRB, or includes only the power control parameter information of the at least one first PRB, or includes both the power configuration information of the at least one first PRB and the power control parameter information of the at least one first PRB.

Correspondingly, as another embodiment, when the power information includes the power configuration information of the at least one first PRB and the power control parameter information of the at least one first PRB, the candidate transmit power used by the first user equipment to send the first signal over each PRB of the at least one first PRB is determined by the first user equipment according to a first power used by the first user equipment to send the first signal over each PRB of the at least one first PRB and a second power used by the first user equipment to send the first signal over each PRB of the at least one first PRB, where the first power is determined by the first user equipment according to the position of the at least one first PRB and the power configuration information of the at least one first PRB, and the second power is determined by the first user equipment according to the position of the at least one first PRB and the power control parameter information of the at least one first PRB.

Further, as another embodiment, the candidate transmit power used by the first user equipment to send the first signal over each PRB of the at least one first PRB is a lower power between the first power and the second power.

Alternatively, as another embodiment, the candidate transmit power used by the first user equipment to send the first signal over each PRB of the at least one first PRB is a lowest power among the maximum transmit power supported by the first user equipment, the first power, and the second power.

Correspondingly, as another embodiment, when the power information includes power configuration information of the at least one first PRB, the candidate transmit power used by the first user equipment to send the first signal over each PRB of the at least one first PRB is a first power, where the first power is determined by the first user equipment according to the position of the at least one first PRB and the power configuration information of the at least one first PRB, or the candidate transmit power used by the first user equipment to send the first signal over each PRB of the at least one first PRB is a lower power between the maximum transmit power supported by the first user equipment and a first power, where the first power is determined by the first user equipment according to the position of the at least one first PRB and the power configuration information of the at least one first PRB.

Correspondingly, as another embodiment, when the power information includes power control parameter information of the at least one first PRB, the candidate transmit power used by the first user equipment to send the first signal over each PRB of the at least one first PRB is a second power, where the second power is determined by the first user equipment according to the position of the at least one first PRB and the power control parameter information of the at least one first PRB, or the candidate transmit power used by the first user equipment to send the first signal over each PRB of the at least one first PRB is a lower power between the maximum transmit power supported by the first user equipment and a second power, where the second power is determined by the first user equipment according to the position of the at least one first PRB and the power control parameter information of the at least one first PRB.

Optionally, as another embodiment, the power control parameter information includes at least one of $P_O(j)$, $f(j)$, and $\alpha(j)$, where j is a position number of a PRB, $P_O(j)$ is a target receive power threshold configured by a system to receive a discovery signal over the (j)th PRB, $f(j)$ is a power control parameter and used to control a power increment value used by a user equipment to send a signal over the (j)th PRB, and $\alpha(j) \in [0,1]$ is a path loss compensation coefficient configured by the system to send a signal over the (j)th PRB.

Furthermore, the second power is determined by the first user equipment according to the following formula:

$$P(j)=(P_O(j)+\alpha(j)\cdot PL+f(j))[dBm],$$

where P(j) is the second power used by the user equipment to send a signal over the (j)th PRB, and PL is a path loss between the base station and the user equipment.

It should be understood that f(j) may be a dynamic signaling control parameter, or may be a semi-static signaling control parameter, or may further be a static signaling control parameter, which is not limited by the embodiment of the present disclosure. The system may also not distinguish dynamic power control on each PRB. In this case, f(j) is degraded to a value and replaced with f. If the system does not use dynamic power control for a discovery signal, f(j) or f is equal to 0.

It should be understood that the system may configure a same target receive power threshold used to receive a discovery signal over each PRB. In this case, $P_O(j)$ is degraded to a value, and, for example, may be replaced with $P_O$. For example, $\alpha(j)$ may be 0, 0.4, 0.6, 0.7, 0.8, 0.9, or the like. The system may also configure a same path loss compensation coefficient used to send a discovery signal over each PRB. In this case, $\alpha(j)$ is degraded to a value, and, for example, may be replaced with $\alpha$. PL includes a path loss, from the base station to the UE, obtained by the UE through calculation. For example, the path loss from the base station to the UE may be obtained by calculating a difference between a transmit power used by the system to send a reference signal and a detected receive power of the reference signal.

Optionally, in the embodiment of the present disclosure, the power configuration information may have multiple types of configurations. Further, as another embodiment, the power configuration information includes a power corresponding to each PRB of the at least one first PRB, and the first power is determined by the first user equipment according to the position of the at least one first PRB and the power corresponding to each PRB of the at least one first PRB. In other words, the first user equipment determines a power in the power configuration information, where the power corresponds to a position of each PRB of the at least one first PRB, and the user equipment determines a corresponding power according to the position of each PRB of the at least one first PRB.

Alternatively, as another embodiment, the power configuration information includes a reference transmit power and an offset value corresponding to each PRB of the at least one first PRB, and the first power is determined by the first user equipment according to the position of the at least one first PRB, the reference transmit power, and the offset value corresponding to each PRB of the at least one first PRB.

Further, the first user equipment acquires the reference transmit power in the power configuration information, where the reference transmit power may be a highest power among transmit powers configured for all PRBs, for example, Pmax, and the offset value is an offset value of each PRB relative to the reference transmit power. In other words, the offset value is a decrement value of the first power of each PRB relative to the reference transmit power, for example, Poffset(j). For each PRB, the first user equipment obtains the first power of each PRB using Pmax−Poffset(j).

Alternatively, as another embodiment, the power configuration information includes an offset value corresponding to each PRB of the at least one first PRB, and the first power is determined by the first user equipment according to the position of the at least one first PRB, the maximum transmit power supported by the first user equipment, and the offset value corresponding to each PRB of the at least one first PRB.

Further, the offset value is an offset value relative to the maximum transmit power supported by the first user equipment, where, for example, the maximum transmit power supported by the first user equipment is Pue_max. In other words, the offset value is a decrement value of the first power of each PRB relative to the maximum transmit power supported by the first user equipment, for example, Poffset.

For each PRB, the first user equipment obtains the first power of each PRB using Pue_max−Poffset.

Optionally, as another embodiment, the transmit power is a power less than or equal to a maximum transmit power used to send the first signal over each PRB of the at least one first PRB, the maximum transmit power used by the first user equipment to send the first signal over each PRB of the at least one first PRB is determined by the first user equipment according to a candidate transmit power used by the first user equipment to send the first signal over each PRB of the at least one first PRB, and the candidate transmit power used by the first user equipment to send the first signal over each PRB of the at least one first PRB is determined by the first user equipment according to preconfigured information, where the preconfigured information indicates the candidate transmit power corresponding to each PRB of the at least one first PRB.

Further, the first user equipment receives a message sent by the base station and acquires power information carried in the message, where the power information includes transmit powers that are in one-to-one correspondence with positions of all PRBs, and the user equipment finds, according to the position of each PRB, the transmit power corresponding to each PRB in the power information.

The foregoing describes in detail a process in which the first user equipment determines, according to the power information sent by the base station, the transmit power used by the first user equipment to send the first signal over the at least one first PRB.

The first user equipment may also determine, according to preconfigured information, the transmit power used by the first user equipment to send the first signal over the at least one first PRB.

Further, as another embodiment, the transmit power is determined by the first user equipment according to the position of at least one first PRB and power information delivered by a base station, where the power information includes the transmit power used by the first user equipment to send the first signal over each PRB of the at least one first PRB. Optionally, as another embodiment, when the at least one first PRB is one PRB, the maximum transmit power used by the first user equipment to send the first signal over each PRB of the at least one first PRB is the candidate transmit power used by the first user equipment to send the first signal over each PRB of the at least one first PRB.

Optionally, as another embodiment, when the at least one first PRB are at least two PRBs, the maximum transmit power used by the first user equipment to send the first signal over each PRB of the at least one first PRB is determined by the first user equipment according to at least one candidate transmit power used by the first user equipment to send the first signal over the at least one first PRB.

Further, as another embodiment, the maximum transmit power used by the first user equipment to send the first signal over each PRB of the at least one first PRB is a lowest power among the at least one candidate transmit power used by the first user equipment to send the first signal over the at least one first PRB.

The foregoing describes in detail the signal sending method according to the embodiment of the present disclosure from a perspective of a first user equipment with reference to FIG. 1 and FIG. 2. The following describes a signal sending method according to an embodiment of the present disclosure from a perspective of a base station with reference to FIG. 3.

It should be understood that the signal sending method described from the perspective of the base station corresponds to that described from the perspective of the first user equipment. For brevity, details are not repeatedly described herein again.

Figure 3:
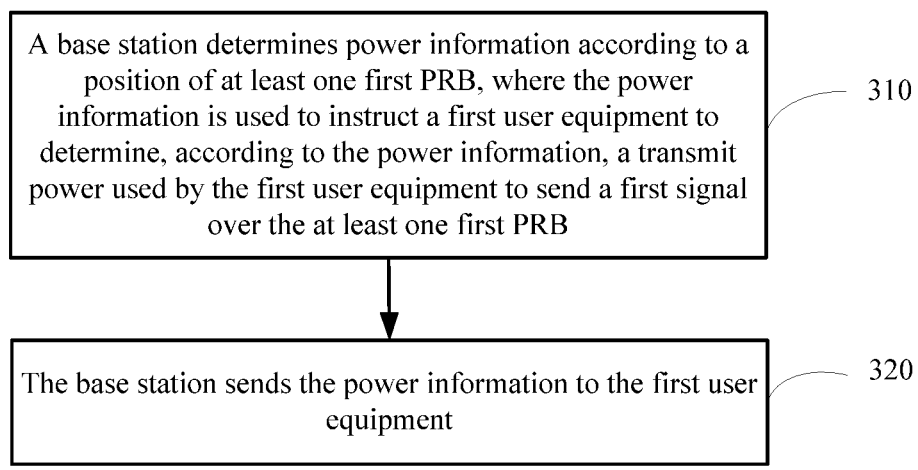
FIG. 3 is a schematic flowchart of a signal sending method according to still another embodiment of the present disclosure.

FIG. 3 is a schematic flowchart of a signal sending method according to still another embodiment of the present disclosure. The method in FIG. 3 corresponds to the method in FIG. 1, so details are not repeatedly described herein again. As shown in FIG. 3, the method includes the following steps:

310: A base station determines power information according to a position of at least one first PRB, where the power information is used to instruct a first user equipment to determine, according to the power information, a transmit power used by the first user equipment to send a first signal over the at least one first PRB.

320: The base station sends the power information to the first user equipment.

Therefore, in the embodiment of the present disclosure, a base station determines power information according to a position of at least one first PRB, and the base station sends the power information to a first user equipment, so that the first user equipment determines, according to the power information, a transmit power used by the first user equipment to send a first signal over the at least one first PRB. In this way, a transmit power of a signal can be flexibly adjusted according to a position of a PRB, and network performance is improved.

It should be understood that, in the embodiment of the present disclosure, at least one first PRB may be one PRB, or may be multiple PRBs, for example, two, three, five, or ten PRBs, or may further be one or more PRB Pairs, which is not limited by the embodiment of the present disclosure.

It should be understood that the first signal may be a discovery signal in D2D, or may be a direct communication signal in D2D, or may further be an uplink signal sent by the first user equipment to the base station. Further, the uplink signal sent by the user equipment to the base station may be a PUCCH signal from a user equipment to a base station, or a PUSCH signal from a user equipment to a base station, which is not limited by the embodiment of the present disclosure.

Optionally, as another embodiment, the power information includes at least one of power configuration information of the at least one first PRB and power control parameter information of the at least one first PRB.

It should be understood that the base station may carry the power information by delivering one or more messages. In other words, the power information may be carried in one message, or may be carried in multiple messages. The one or more messages are determined by the base station according to the position of the at least one first PRB, and the first user equipment determines, according to the one or more messages, the transmit power used by the first user equipment to send the first signal over the first PRB, which is not limited by the embodiment of the present disclosure.

In addition, in the embodiment of the present disclosure, the base station may determine the power information according to at least the position of the at least one first PRB, and the base station sends the power information to the first user equipment, so that the first user equipment determines, according to the power information, a power used by the first user equipment to send the first signal over the at least one first PRB. In addition, a shorter distance between the at least one first PRB and a second PRB causes a lower transmit power used to send the first signal over the at least one first PRB. A transmit power of a signal can be flexibly adjusted according to a position of a PRB, so that interference caused by the first signal in a second signal sent over the second PRB is lower than a preset level. Further, in the embodiment of the present disclosure, the power used to send the first signal in a position may be adjusted according to the position, and the interference caused by the sent first signal in the second signal sent in another position can be reduced, thereby improving network performance.

The second signal may be sent by the first user equipment, or may be sent by a second user equipment. It should also be understood that the second PRB may be one PRB, or may be multiple PRBs, for example, two, three, five, or ten PRBs, or may further be one or more PRB Pairs. That is, the second signal may be sent by occupying one PRB, or may be sent by occupying multiple PRBs, which is not limited by the embodiment of the present disclosure.

It should be understood that the second signal may be a discovery signal in D2D, or may be a direct communication signal in D2D, or may further be an uplink signal sent by the first user equipment or the second user equipment to the base station, which is not limited by the embodiment of the present disclosure. Further, when the first signal is a discovery signal or a direct communication signal in D2D, the second signal may be an uplink signal sent by the user equipment to the base station. When the first signal is an uplink signal sent by the user equipment to the base station, the second signal may be a discovery signal or a direct communication signal in D2D. The uplink signal sent by the user equipment to the base station may be a PUCCH signal from a user equipment to a base station, or a PUSCH signal from a user equipment to a base station, which is not limited by the embodiment of the present disclosure.

It should be understood that, in the embodiment of the present disclosure, the base station may send the power information to the user equipment, where the power information indicates the transmit power used by the user equipment to send the first signal over the at least one first PRB. The base station may further send the power information to the user equipment, where the power information includes the transmit power used by the user equipment to send the first signal over the at least one first PRB.

Correspondingly, as another embodiment, the power information includes at least one of the power configuration information of the at least one first PRB and the power control parameter information of the at least one first PRB.

Further, according to the embodiment of the present disclosure, the power control parameter information includes at least one of $P_O(j)$, $f(j)$, and $\alpha(j)$, where j is a position number of a PRB, $P_O(j)$ is a target receive power threshold configured by a system to receive a discovery signal over the (j)th PRB, $\alpha(j) \in [0,1]$ is a path loss compensation coefficient configured by the system to send a signal over the (j)th PRB, and f(j) is a power control parameter and used to control a power increment value used by a user equipment to send a signal over the (j)th PRB.

It should be understood that f(j) may be a dynamic signaling control parameter, or may be a semi-static signaling control parameter, or may further be a static signaling control parameter, which is not limited by the embodiment of the present disclosure. The system may also not distinguish dynamic power control on each PRB. In this case, f(j) is degraded to a value and replaced with f. If the system does not use dynamic power control for a discovery signal, f(j) or f is equal to 0.

It should be understood that the system may configure a same target receive power threshold used to receive a discovery signal over each PRB. In this case, $P_O(j)$ is degraded to a value, and, for example, may be replaced with $P_O$. For example, $\alpha(j)$ may be 0, 0.4, 0.6, 0.7, 0.8, 0.9, or the like. The system may also configure a same path loss compensation coefficient used to send a discovery signal over each PRB. In this case, $\alpha(j)$ is degraded to a value, and, for example, may be replaced with $\alpha$. PL includes a path loss, from the base station to the UE, obtained by the UE through calculation. For example, the path loss from the base station to the UE may be obtained by calculating a difference between a transmit power used by the system to send a reference signal and a detected receive power of the reference signal.

The base station sends the foregoing power control parameter information to the first user equipment, so that the first user equipment determines, according to the power parameter information, the power used by the first user equipment to send the first signal over the at least one first PRB.

Further, the transmit power is determined by the first user equipment according to the following formula:

$$P(j)=(P_O(j)+\alpha(j) \cdot PL+f(j))[\text{dBm}],$$

where P(j) is the transmit power used by the user equipment to send a signal over the (j)th PRB, and PL is a path loss between the base station and the user equipment.

Optionally, as another embodiment, the power information includes the transmit power used by the first user equipment to send the first signal over the at least one first PRB, and the method further includes, determining, by the base station according to at least one of the power configuration information of the at least one first PRB and power control parameter information of the at least one first PRB, a candidate transmit power used by the first user equipment to send the first signal over the at least one first PRB, and determining, by the base station according to the candidate transmit power used by the first user equipment to send the first signal over the at least one first PRB, a maximum transmit power used by the first user equipment to send the first signal over each PRB of the at least one first PRB.

Further, as another embodiment, the candidate transmit power used by the first user equipment to send the first signal over each PRB of the at least one first PRB is determined by the base station according to a first power used by the first user equipment to send the first signal over each PRB of the at least one first PRB and a second power used by the first user equipment to send the first signal over each PRB of the at least one first PRB, where the first power is determined by the base station according to the power configuration information of the at least one first PRB, and the second power is determined by the base station according to the power control parameter information of the at least one first PRB.

Furthermore, as another embodiment, the candidate transmit power used by the first user equipment to send the first signal over each PRB of the at least one first PRB is a lower power between the first power and the second power.

Alternatively, as another embodiment, the candidate transmit power used by the first user equipment to send the first signal over each PRB of the at least one first PRB is a lowest power among the maximum transmit power supported by the first user equipment, the first power, and the second power.

Optionally, as another embodiment, the candidate transmit power used by the first user equipment to send the first signal over each PRB of the at least one first PRB is a first power, where the first power is determined by the base station according to the power configuration information of the at least one first PRB, or the candidate transmit power used by the first user equipment to send the first signal over each PRB of the at least one first PRB is a lower power between the maximum transmit power supported by the first user equipment and a first power, where the first power is determined by the base station according to the power configuration information of the at least one first PRB.

Optionally, as another embodiment, the candidate transmit power used by the first user equipment to send the first signal over each PRB of the at least one first PRB is a second power, where the second power is determined by the base station according to the power control parameter information of the at least one first PRB, or the candidate transmit power used by the first user equipment to send the first signal over each PRB of the at least one first PRB is a lower power between the maximum transmit power supported by the first user equipment and a second power, where the second power is determined by the base station according to the power control parameter information of the at least one first PRB.

Furthermore, as another embodiment, the power control parameter information includes at least one of $P_O(j)$, f(j), and $\alpha(j)$, where j is a position number of a PRB, $P_O(j)$ is a target receive power threshold configured by a system to receive a discovery signal over the (j)th PRB, $\alpha(j) \in [0,1]$ is a path loss compensation coefficient configured by the system to send a signal over the (j)th PRB, and f(j) is a power control parameter and used to control a power increment value used by a user equipment to send a signal over the (j)th PRB.

Specifically, the second power is determined according to the following formula:

$$P(j)=(P_O(j)+\alpha(j) \cdot PL+f(j))[\text{dBm}],$$

where P(j) is the second power used by the user equipment to send a signal over the (j)th PRB, and PL is a path loss between the base station and the user equipment.

It should be understood that f(j) may be a dynamic signaling control parameter, or may be a semi-static signaling control parameter, or may further be a static signaling control parameter, which is not limited by the embodiment of the present disclosure. The system may also not distinguish dynamic power control on each PRB. In this case, f(j) is degraded to a value and replaced with f. If the system does not use dynamic power control for a discovery signal, f(j) or f is equal to 0.

It should be understood that the system may configure a same target receive power threshold used to receive a discovery signal over each PRB. In this case, $P_O(j)$ is degraded to a value, and, for example, may be replaced with $P_O$. For example, $\alpha(j)$ may be 0, 0.4, 0.6, 0.7, 0.8, 0.9, or the like. The system may also configure a same path loss compensation coefficient used to send a discovery signal over each PRB. In this case, $\alpha(j)$ is degraded to a value, and, for example, may be replaced with $\alpha$. PL includes a path loss, from the base station to the UE, obtained by the UE through calculation. For example, the path loss from the base station to the UE may be obtained by calculating a difference between a transmit power used by the system to send a reference signal and a detected receive power of the reference signal.

Furthermore, as another embodiment, the power configuration information includes one of the following items: a power corresponding to each PRB of the at least one first PRB, a reference transmit power and an offset value corresponding to each PRB of the at least one first PRB, and the offset value corresponding to each PRB of the at least one first PRB.

Further, when the power configuration information includes the power corresponding to each PRB of the at least one first PRB, the base station determines, according to the power configuration information, the first power used by the first user equipment to send the first signal over each PRB of the at least one first PRB.

Alternatively, the power configuration information includes the reference transmit power and the offset value corresponding to each PRB of the at least one first PRB, and the base station determines, according to the power configuration information, the first power used by the first user equipment to send the first signal over each PRB of the at least one first PRB.

Further, the base station configures the reference transmit power in the power configuration information, where the reference transmit power may be a highest power among transmit powers configured for all PRBs, for example, Pmax, and the offset value is an offset value of each PRB relative to the reference transmit power. In other words, the offset value is a decrement value of the first power of each PRB relative to the reference transmit power, for example, Poffset(j). For each PRB, the base station obtains the first power of each PRB based on Pmax−Poffset(j).

Alternatively, the power configuration information includes an offset value corresponding to each PRB of the at least one first PRB, and the base station determines, according to the power configuration information, the first power used by the first user equipment to send the first signal over each PRB of the at least one first PRB.

Further, the offset value is an offset value relative to a maximum transmit power supported by the first user equipment, where, for example, the maximum transmit power supported by the first user equipment is Pue_max. In other words, the offset value is a decrement value of the first power of each PRB relative to the maximum transmit power supported by the first user equipment, for example, Poffset. For each PRB, the base station obtains the first power of each PRB using Pue_max−Poffset.

Optionally, as another embodiment, when the at least one first PRB is one PRB, the maximum transmit power used by the first user equipment to send the first signal over each PRB of the at least one first PRB is the candidate transmit power used by the first user equipment to send the first signal over each PRB of the at least one first PRB.

Optionally, as another embodiment, when the at least one first PRB are at least two PRBs, the maximum transmit power used by the first user equipment to send the first signal over each PRB of the at least one first PRB is determined by the base station according to at least one candidate transmit power used by the first user equipment to send the first signal over the at least one first PRB.

Further, as another embodiment, the maximum transmit power used by the first user equipment to send the first signal over each PRB of the at least one first PRB is a lowest power among the at least one candidate transmit power used by the first user equipment to send the first signal over the at least one first PRB.

The foregoing describes in detail the signal sending method according to the embodiment of the present disclosure from a perspective of a first user equipment with reference to FIG. 1 and FIG. 2, and describes the signal sending method according to the embodiment of the present disclosure from a perspective of a base station with reference to FIG. 3.

The following describes in more detail the embodiment of the present disclosure with reference to specific examples. It should be noted that the examples in FIG. 1 to FIG. 3 are merely intended to help a person skilled in the art understand the embodiment of the present disclosure, rather than limit the embodiment of the present disclosure to the exemplary specific values or specific scenarios. A person skilled in the art may make equivalent modifications or variations according to the examples provided in FIG. 1 to FIG. 3, and such modifications or variations shall fall within the scope of the embodiment of the present disclosure.

Figure 4:
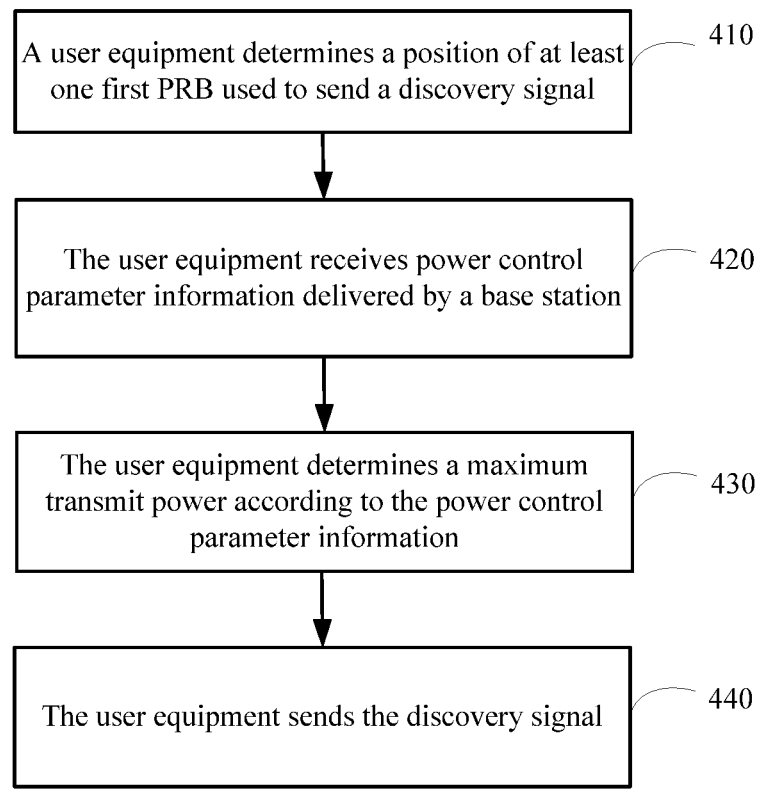
FIG. 4 is a schematic flowchart of a signal sending method according to still another embodiment of the present disclosure.
Figure 5:
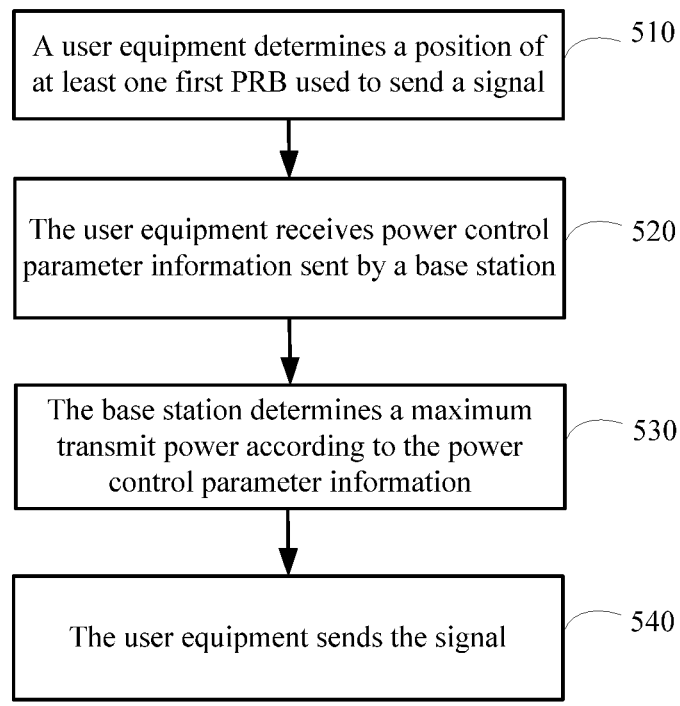
FIG. 5 is a schematic flowchart of a signal sending method according to still another embodiment of the present disclosure.

The following describes in detail the signal sending method according to the embodiment of the present disclosure with reference to FIG. 4 and FIG. 5. FIG. 4 and FIG. 5 are examples of FIG. 1 to FIG. 3, a signal in FIG. 4 is a discovery signal, and FIG. 4 shows a case in which a user equipment determines a transmit power of the discovery signal according to a power control parameter delivered by a base station. Further, as shown in FIG. 4, the method includes the following steps:

410: A user equipment determines a position of at least one first PRB used to send a discovery signal.

Further, the user equipment may determine, according to scheduling information of a base station, the at least one first PRB used to send the discovery signal, or the user equipment may also determine, according to a resource utilization condition, the at least one first PRB used to send the discovery signal, or may further determine, according to pre-configuration, the at least one first PRB used to send the discovery signal, which is not limited by the embodiment of the present disclosure. The at least one first PRB may be one PRB or multiple PRBs.

420: The user equipment receives power control parameter information delivered by a base station.

Further, the base station determines a message according to a position of a PRB used to send the discovery signal, and sends the message to the user equipment. The user equipment receives the message, and obtains the power control parameter information in the message. For example, the power control parameter is at least one of $P_{O\_discovery}(j)$, $f(j)$, and $\alpha(j)$, where $\alpha(j)\in[0,1]$ is a path loss compensation coefficient configured by a system to send a discovery signal over PRB (j), $P_{O\_discovery}(j)$ is a target receive power threshold configured by the system to receive a discovery signal over the (j)th PRB, and $f(j)$ is a power control parameter and used to control a power increment value used by a user equipment to send a signal over the (j)th PRB.

430: The user equipment determines a maximum transmit power according to the power control parameter information.

Further, when the at least one first PRB is one PRB, and the transmit power of the discovery signal is determined according to only the power control parameter, the transmit power is determined according to the following formula:

$$P_{discovery}(j)=(P_{O\_discovery}(j)+\alpha(j)\cdot PL+f(j))[dBm]$$

where $P_{discovery}(j)$ is a maximum transmit power used by the UE to send the discovery signal over the (j)th PRB, PL is a path loss from the base station to the UE, and PL=Transmit power used by a system to send a reference signal—Receive power that is of a reference signal and detected by a UE.

When the at least one first PRB are multiple PRBs, and the transmit power of the discovery signal is determined according to only the power control parameter, for example, the at least one first PRB is the jth PRB to the j+1th PRB, the candidate transmit power is determined according to the following formula:

$$P_{discovery}(j)=(P_{O\_discovery}(j)+\alpha(j)\cdot PL+f(j))[dBm]$$

where $P_{discovery}(j)$ is a candidate transmit power used by the UE to send the discovery signal over the (j)th PRB, PL is a path loss from a serving base station to the UE that is obtained by the UE through calculation, and PL=Transmit power used by a system to send a reference signal—Receive power that is of a reference signal of detected by a UE.

The candidate transmit power $P_{discovery}(j+1)$ is obtained in a same manner. The user equipment may send the discovery signal over the (j)th PRB and the (j+1)th PRB using a power less than or equal to $P_{discovery}(j)$, or may send the discovery signal over the (j)th PRB and the (j+1)th PRB using a power less than or equal to $P_{discovery}(j+1)$, or may send the discovery signal over the (j)th PRB and the (j+1)th PRB using a power less than or equal to $\hat{P}_{discovery}(j)+\hat{P}_{discovery}(j+1)$, or may send the discovery signal over the (j)th PRB and the (j+1)th PRB using a power less than or equal to $(\hat{P}_{discovery}(j)+\hat{P}_{discovery}(j+1))/2$ Or may send the discovery signal over the (j)th PRB and the (j+1)th PRB using a power less than or equal to $2*\max(\hat{P}_{discovery}(j), \hat{P}_{discovery}(j+1))$, or may send the discovery signal over the (j)th PRB and the (j+1)th PRB using a power less than or equal to $2*\min(\hat{P}_{discovery}(j), \hat{P}_{discovery}(j+1))$, where $\hat{P}_{discovery}(j)$ and $\hat{P}_{discovery}(j+1)$ are natural numbers (linear numbers) corresponding to $P_{discovery}(j)$ and $P_{discovery}(j+1)$, respectively.

When the at least one first PRB is one PRB, and both a maximum transmit power that can be supported by the UE and a maximum transmit power configured by the system to send the discovery signal over the (j)th PRB are considered, the maximum transmit power used to transmit a signal is determined according to the following formula:

$$P_{discovery}(j) = \min \begin{Bmatrix} P_{UE\_max} \\ P_{CMAX}(j), \\ P_{O\_discovery}(j) + \alpha(j) \cdot PL + f(j) \end{Bmatrix} [dBm],$$

where $P_{UE\_max}$ is the maximum transmit power that can be supported by the UE, and $P_{CMAX}(j)$ is the maximum transmit power configured by the system to send the discovery signal over the (j)th PRB.

In other words, the user equipment selects a smallest value among $P_{UE\_max}$, $P_{CMAX}(j)$, and $P_{O\_discovery}(j)+\alpha(j) \cdot PL+f(j)$ as the maximum power used to send the discovery signal over the PRB.

When the at least one first PRB are multiple PRBs, and both the maximum transmit power that can be supported by the UE and the maximum transmit power configured by the system to send the discovery signal over the (j)th PRB are considered, the candidate transmit power used to transmit a signal is determined according to the following formula:

$$P_{discovery}(j) = \min \begin{Bmatrix} P_{UE\_max} \\ P_{CMAX}(j), \\ P_{O\_discovery}(j) + \alpha(j) \cdot PL + f(j) \end{Bmatrix} [dBm].$$

In other words, the user equipment selects a smallest value among $P_{UE\_max}$, $P_{CMAX}(j)$, and $P_{O\_discovery}(j)+\alpha(j) \cdot PL+f(j)$ as the candidate transmit power used to send the discovery signal over the PRB.

The user equipment may determine, according to multiple candidate transmit powers corresponding to multiple RPBs, transmit powers used to send the discovery signal over the multiple PRBs. For example, the smallest value or an average value of the multiple candidate transmit powers is used as the maximum transmit power used to send the discovery signal over each PRB of the multiple RPBs.

440: The user equipment sends the discovery signal.

Further, the user equipment sends, according to the maximum transmit power, the discovery signal using a power less than or equal to the maximum transmit power.

In a conventional D2D ProSe, when a signal is sent, the signal is multiplexed with an uplink signal sent by a common UE in a frequency division multiplexing manner. Because a subframe format of a signal sent between D2D is different from a subframe format of an uplink signal sent by the common UE, when receiving a D2D signal, the user equipment may encounter intra-carrier interference caused by the uplink signal. When sending a discovery signal, a conventional UE uses a maximum power to transmit the discovery signal, and the power used to send the discovery signal cannot be adjusted according to a position. As a result, reliability for transmitting an uplink control signal from the UE to the base station is decreased, and performance of an entire system is further affected. However, in the embodiment of the present disclosure, a transmit power is determined according to a position for sending a discovery signal, and the transmit power can be flexibly adjusted, thereby reducing the impact on a control signal and improving system performance.

FIG. 5 shows a case in which a signal is a signal from a user equipment to a base station, and the user equipment determines a transmit power of the signal according to a power control parameter delivered by the base station. Further, as shown in FIG. 5, the method includes the following steps:

510: A user equipment determines a position of at least one first PRB used to send a signal.

Further, the signal from the user equipment to a base station may be a PUCCH signal from a user equipment to a base station, or a PUSCH signal from a user equipment to a base station. The user equipment may determine, according to scheduling information of the base station, the position of the at least one first PRB used to send the signal. The base station may also determine, according to a received resource utilization condition of the user equipment, the at least one first PRB used to send the signal, or may determine, according to pre-configuration, the at least one first PRB used by the user equipment to send the signal, which is not limited by the embodiment of the present disclosure. The at least one first PRB may be one PRB or multiple PRBs.

520: The user equipment receives power control parameter information sent by a base station.

Further, the base station determines a message according to a position of a PRB used to send a signal, sends the message to the user equipment. The user equipment receives the message, and obtains the power control parameter information in the message. When the signal is a PUSCH signal, for example, a power control parameter is at least one of $P_{O\_PUSCH}(j)$, $f(j)$, and $\alpha(j)$, where $P_{O\_PUSCH}(j)$ is a target receive power threshold configured by a system to receive the signal over the (j)th PRB, $f(j)$ is a signal power adjustment amount and used to control a power increment value used by the UE to send the signal over the (j)th PRB, and $\alpha(j) \in [0,1]$ is a path loss compensation coefficient configured by the system to send the signal over the (j)th PRB. When the signal is a PUCCH signal, the power control parameter is at least one of $P_{O\_PUCCH}(j)$ and $g(j)$, where $P_{O\_PUCCH}(j)$ is a target receive power threshold configured by the system to receive the signal over the (j)th PRB, and $g(j)$ is a signal power adjustment amount and used to control a power increment value used by the UE to send the signal over the (j)th PRB.

530: The base station determines a maximum transmit power according to the power control parameter information.

Further, when the at least one first PRB is one PRB, and the signal is a PUSCH signal, the transmit power is determined according to the following formula:

$$P_{PUSCH}(j)=(P_{O\_PUSCH}(j)+\alpha(j)\cdot PL+\Delta_{TF}+f(j))[\text{dBm}],$$

where $P_{PUSCH}(j)$ is a maximum transmit power used by the UE to send a discovery signal over the (j)th PRB, $P_{O\_PUSCH}(j)$ is a target receive power threshold configured by a system to receive a signal over the (j)th PRB, PL is a path loss from a serving base station to the UE that is obtained by the UE through calculation, $\Delta_{TF}$ is a power adjustment amount and varies with a transmission rate, and f(j) is a signal power adjustment amount and used to control a power increment value used by the UE to send a signal over the (j)th PRB.

Alternatively, when the at least one first PRB are multiple PRBs, and the signal is a PUSCH signal, the transmit power is determined according to the following formula:

$$P_{PUSCH}(j)=(10 \log_{10}(M_{PUSCH})+P_{O\_PUSCH}(j)+\alpha(j)\cdot PL+\Delta_{TF}f(j))[\text{dBm}],$$

where $M_{PUSCH}$ is a quantity of the at least one first PRB.

When the at least one first PRB is one PRB, and the signal is a PUCCH signal, a candidate transmit power is determined according to the following formula:

$$P_{PUCCH}(j)=(P_{O\_PUCCH}(j)+PL_c+h(n_{CQI},n_{HARQ},n_{SR})+\Delta_{F\_PUCCH}(F)+\Delta_{TxD}(F')+g(i))[\text{dBm}],$$

where $P_{O\_PUCCH}(j)$ is a target receive power threshold configured by the system to receive the signal over the (j)th PRB, PL is a path loss between the base station and the UE, $h(n_{CQI}, n_{HARQ}, n_{SR})$ is a power adjustment value related to a PUCCH format, where $n_{CQI}$ is a quantity of bits in channel quality information; $n_{SR}$ indicates whether it is scheduling request information; $n_{HARQ}$ information; n is a quantity of bits in hybrid automatic repeat request(HARQ) information; $\Delta_{F\_PUCCH}(F)$ is a power adjustment amount determined using the PUCCH format; and $\Delta_{TxD}(F')$ is a power adjustment amount determined using uplink transmit diversity.

540: The user equipment sends the signal.

Further, the user equipment sends, according to the maximum transmit power, the signal using a power greater than or equal to the maximum transmit power.

In the D2D technology, because a subframe format of a signal sent between D2D is different from a subframe format of an uplink signal sent by a common UE, when receiving an uplink signal, the base station may encounter intra-carrier interference caused by a D2D signal, thereby significantly decreasing transmission reliability of a control signal. In the embodiment of the present disclosure, a power is determined according to a position of a PRB used to send a control signal, and a transmit power of the control signal can be flexibly adjusted, thereby improving network performance.

It should be noted that the examples in FIG. 4 and FIG. 5 are intended to help a person skilled in the art better understand the embodiment of the present disclosure, rather than limit the scope of the embodiment of the present disclosure. A person skilled in the art may make equivalent modifications or variations according to the examples in FIG. 4 and FIG. 5, and such modifications or variations shall fall within the scope of the embodiment of the present disclosure.

It should be understood that sequence numbers of the foregoing processes do not mean execution sequences. The execution sequences of the processes should be determined according to functions and internal logic of the processes, and should not be construed as any limitation on the implementation processes of the embodiments of the present disclosure.

The foregoing describes in detail the signal sending method according to the embodiment of the present disclosure with reference to FIG. 1 to FIG. 5. The following describes in detail a user equipment according to an embodiment of the present disclosure with reference to FIG. 6 and FIG. 7, and describes in detail a base station according to an embodiment of the present disclosure with reference to FIG. 8, FIG. 9, and FIG. 10.

Figure 6:
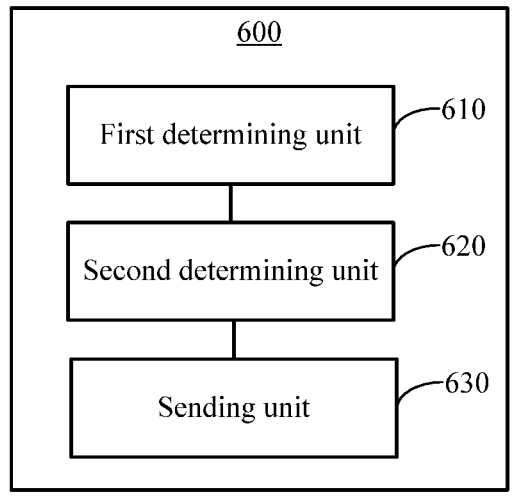
FIG. 6 is a schematic block diagram of a user equipment according to an embodiment of the present disclosure.

FIG. 6 is a schematic block diagram of a user equipment according to an embodiment of the present disclosure. A user equipment 600 shown in FIG. 6 includes a first determining unit 610, a second determining unit 620, and a sending unit 630.

Furthermore, the first determining unit 610 is configured to determine at least one first PRB used to send a first signal. The second determining unit 620 is configured to determine, according to a position of the at least one first PRB, a transmit power used by the user equipment 600 to send the first signal over the at least one first PRB, and the sending unit 630 is configured to send the first signal over the at least one first PRB using the transmit power.

The user equipment provided in the embodiment of the present disclosure can adjust a transmit power of a signal according to a position of a PRB used to send the signal, so that a specific transmit power can be set in a specific time-frequency resource position according to a performance requirement of network communication, and the transmit power of the signal can be flexibly adjusted, thereby improving performance of network communication.

It should be understood that the transmit power is a power in an actual application and may be a power greater than or less than a maximum transmit power.

According to the embodiment of the present disclosure, the transmit power is a power less than or equal to a maximum transmit power used by the user equipment to send the first signal over each PRB of the at least one first PRB, the maximum transmit power used by the user equipment to send the first signal over each PRB of the at least one first PRB is determined by the user equipment according to a candidate transmit power used by the user equipment to send the first signal over each PRB of the at least one first PRB, and the candidate transmit power used by the user equipment to send the first signal over each PRB of the at least one first PRB is determined by the user equipment according to the position of the at least one first PRB and power information delivered by a base station.

Optionally, as another embodiment, the power information includes power configuration information of the at least one first PRB and power control parameter information of the at least one first PRB, and the candidate transmit power used by the user equipment to send the first signal over each PRB of the at least one first PRB is determined by the user equipment according to a first power used by the user equipment to send the first signal over each PRB of the at least one first PRB and a second power used by the user equipment to send the first signal over each PRB of the at least one first PRB, where the first power is determined by the user equipment according to the position of the at least one first PRB and the power configuration information of the at least one first PRB, and the second power is determined by the user equipment according to the position of the at least one first PRB and the power control parameter information of the at least one first PRB.

Alternatively, as another embodiment, the power information includes power control parameter information of a first user equipment and power configuration information of the at least one first PRB. The candidate transmit power used by the user equipment to send the first signal over each PRB of the at least one first PRB is determined by the user equipment according to a first power and a second power, where the first power is determined by the user equipment according to the position of the at least one first PRB and the power configuration information of the at least one first PRB, and the second power is determined by the user equipment according to the position of the at least one first PRB and the power control parameter information of the user equipment.

Optionally, as another embodiment, the power information includes power configuration information of a first user equipment and power control parameter information of the at least one first PRB, and the candidate transmit power used by the user equipment to send the first signal over each PRB of the at least one first PRB is determined by the user equipment according to a first power and a second power, where the first power is determined by the user equipment according to the position of the at least one first PRB and the power configuration information of the user equipment, and the second power is determined by the user equipment according to the position of the at least one first PRB and the power control parameter information of the at least one first PRB.

Optionally, as another embodiment, the candidate transmit power used by the user equipment to send the first signal over each PRB of the at least one first PRB is a lower power between the first power and the second power.

Optionally, as another embodiment, the candidate transmit power used by the user equipment to send the first signal over each PRB of the at least one first PRB is a lowest power among the maximum transmit power supported by the user equipment, the first power, and the second power.

Optionally, as another embodiment, the power information includes power configuration information of the at least one first PRB, and the candidate transmit power used by the user equipment to send the first signal over each PRB of the at least one first PRB is a first power, where the first power is determined by the user equipment according to the position of the at least one first PRB and the power configuration information of the at least one first PRB, or the candidate transmit power used by the user equipment to send the first signal over each PRB of the at least one first PRB is a lower power between the maximum transmit power supported by the user equipment and a first power, where the first power is determined by the user equipment according to the position of the at least one first PRB and the power configuration information of the at least one first PRB.

Optionally, as another embodiment, the power information includes power control parameter information of the at least one first PRB, and the candidate transmit power used by the user equipment to send the first signal over each PRB of the at least one first PRB is a second power, where the second power is determined by the user equipment according to the position of the at least one first PRB and the power control parameter information of the at least one first PRB, or the candidate transmit power used by the user equipment to send the first signal over each PRB of the at least one first PRB is a lower power between the maximum transmit power supported by the user equipment and a second power, where the second power is determined by the user equipment according to the position of the at least one first PRB and the power control parameter information of the at least one first PRB.

Optionally, as another embodiment, the power control parameter information includes at least one of $P_O(j)$, $f(j)$, and $\alpha(j)$, where j is a position number of a PRB, $P_O(j)$ is a target receive power threshold configured by a system to receive a discovery signal over the (j)th PRB, $f(j)$ is a power control parameter and used to control a power increment value used by a user equipment to send a signal over the (j)th PRB, and $\alpha(j) \in [0,1]$ is a path loss compensation coefficient configured by the system to send a signal over the (j)th PRB.

Further, the second power is determined by the user equipment according to the following formula:

$$P(j)=(P_O(j)+\alpha(j)\cdot PL+f(j))[\text{dBm}],$$

where $P(j)$ is a maximum transmit power used by the user equipment to send a signal over the (j)th PRB, and PL is a path loss between the base station and the user equipment.

Optionally, as another embodiment, the power configuration information includes a power corresponding to each PRB of the at least one first PRB, and the first power is determined by the user equipment according to the position of the at least one first PRB and the power corresponding to each PRB of the at least one first PRB.

Optionally, as another embodiment, the power configuration information includes a reference transmit power and an offset value corresponding to each PRB of the at least one first PRB, and the first power is determined by the user equipment according to the position of the at least one first PRB, the reference transmit power, and the offset value corresponding to each PRB of the at least one first PRB.

Optionally, as another embodiment, the power configuration information includes an offset value corresponding to each PRB of the at least one first PRB, and the first power is determined by the user equipment according to the position of the at least one first PRB, the maximum transmit power supported by the user equipment, and the offset value corresponding to each PRB of the at least one first PRB.

Alternatively, as another embodiment, the transmit power is a power less than or equal to a maximum transmit power used to send the first signal over each PRB of the at least one first PRB, the maximum transmit power used by a user equipment to send the first signal over each PRB of the at least one first PRB is determined by the user equipment according to a candidate transmit power used by the user equipment to send the first signal over each PRB of the at least one first PRB, and the candidate transmit power used by the user equipment to send the first signal over each PRB of the at least one first PRB is determined by the user equipment according to preconfigured information, where the preconfigured information indicates the candidate transmit power corresponding to each PRB of the at least one first PRB.

Alternatively, as another embodiment, the transmit power is determined by the user equipment according to the position of the at least one first PRB and power information delivered by a base station, where the power information includes the transmit power used by the user equipment to send the first signal over each PRB of the at least one first PRB.

Optionally, as another embodiment, when the at least one first PRB is one PRB, the maximum transmit power used by the user equipment to send the first signal over each PRB of the at least one first PRB is the candidate transmit power used by the user equipment to send the first signal over each PRB of the at least one first PRB.

Optionally, as another embodiment, when the at least one first PRB are at least two PRBs, the maximum transmit power used by the user equipment to send the first signal over each PRB of the at least one first PRB is determined by the user equipment according to at least one candidate transmit power used by the user equipment to send the first signal over the at least one first PRB.

Furthermore, as another embodiment, the maximum transmit power used by the user equipment to send the first signal over each PRB of the at least one first PRB is a lowest power among at least one candidate transmit power used by the user equipment to send the first signal over the at least one first PRB.

Optionally, as another embodiment, the first signal is any one of a D2D discovery signal, a D2D direct communication signal, a PUCCH signal from a user equipment to a base station, and a PUSCH signal from a user equipment to a base station.

It should be noted that the user equipment shown in FIG. 6 can implement each process that is implemented by the user equipment in the method embodiments of FIG. 1 to FIG. 5. For other functions and operations of the user equipment 600, reference may be made to the processes that are related to the user equipment in the method embodiments of FIG. 1 to FIG. 5. To avoid repetition, details are not described herein again.

Figure 7:
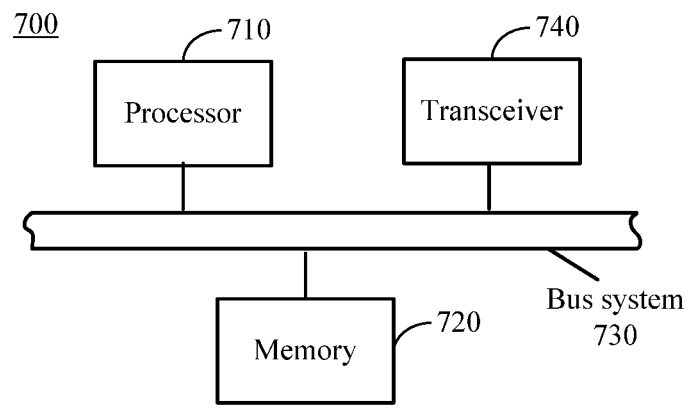
FIG. 7 is a schematic block diagram of a user equipment according to another embodiment of the present disclosure.

FIG. 7 is a schematic block diagram of a user equipment according to another embodiment of the present disclosure. A user equipment 700 shown in FIG. 7 includes a processor 710, a memory 720, a bus system 730, and a transceiver 740. The processor 710, the memory 720, and the transceiver 740 are connected using the bus system 730.

Further, the processor 710 is configured to invoke, using the bus system 730, code stored in the memory 720, and determine at least one first PRB used to send a first signal, determine, according to a position of the at least one first PRB, a transmit power used by the user equipment 700 to send the first signal over the at least one first PRB. The transceiver 740 is configured to send the first signal over the at least one first PRB using the determined transmit power.

The user equipment provided in the embodiment of the present disclosure can adjust a transmit power of a signal according to a position of a PRB used to send the signal, so that a specific transmit power can be set in a specific time-frequency resource position according to a performance requirement of network communication, and the transmit power of the signal can be flexibly adjusted, thereby improving performance of network communication.

The method disclosed in the foregoing embodiment of the present disclosure may be applied to the processor 710, or may be implemented by the processor 710. The processor 710 may be an integrated circuit chip and is capable of processing signals. In the implementation process, each step of the foregoing method may be implemented by an integrated logic circuit of hardware in the processor 710 or using an instruction in a form of software in the processor 710. The foregoing processor 710 may be a general-purpose processor, a digital signal processor (DSP), an application specific integrated circuit (ASIC), a field programmable gate array (FPGA) or another programmable logic device, a discrete gate or transistor logic device, or a discrete hardware component. The processor 710 can implement or execute each method, step, and logic block diagram disclosed in the embodiment of the present disclosure. The general-purpose processor may be a microprocessor, or the processor may be any conventional processor or the like. The steps of the method disclosed in the embodiment of the present disclosure may be directly executed by a hardware decoding processor, or be executed using a combination of a hardware module and a software module in a decoding processor. The software module may be located in a mature storage medium in the prior art, such as a random access memory (RAM), a flash memory, a read-only memory (ROM), a programmable read-only memory, an electrically erasable programmable memory, or a register. The storage medium is located in the memory 720. The processor 710 reads information in the memory 720, and implements the steps of the foregoing method in combination with hardware of the processor 710. In addition to a data bus, the bus system 730 may further include a power bus, a control bus, a status signal bus, and the like. However, for clarity, different types of buses are collectively marked as the bus system 730 in the figure.

It should be understood that the transmit power is a power in an actual application and may be a power greater than or less than a maximum transmit power.

According to the embodiment of the present disclosure, the transmit power is a power less than or equal to a maximum transmit power used by the user equipment to send the first signal over each PRB of the at least one first PRB, the maximum transmit power used by the user equipment to send the first signal over each PRB of the at least one first PRB is determined by the user equipment according to a candidate transmit power used by the user equipment to send the first signal over each PRB of the at least one first PRB, and the candidate transmit power used by the user equipment to send the first signal over each PRB of the at least one first PRB is determined by the user equipment according to the position of the at least one first PRB and power information delivered by a base station.

Optionally, as another embodiment, the power information includes power configuration information of the at least one first PRB and power control parameter information of the at least one first PRB, and the candidate transmit power used by the user equipment to send the first signal over each PRB of the at least one first PRB is determined by the user equipment according to a first power used by the user equipment to send the first signal over each PRB of the at least one first PRB and a second power used by the user equipment to send the first signal over each PRB of the at least one first PRB, where the first power is determined by the user equipment according to the position of the at least one first PRB and the power configuration information of the at least one first PRB, and the second power is determined by the user equipment according to the position of the at least one first PRB and the power control parameter information of the at least one first PRB.

Alternatively, as another embodiment, the power information includes power control parameter information of a first user equipment and power configuration information of at least one first PRB. The candidate transmit power used by the user equipment to send the first signal over each PRB of the at least one first PRB is determined by the user equipment according to a first power and a second power, where the first power is determined by the user equipment according to the position of the at least one first PRB and the power configuration information of the at least one first PRB, and the second power is determined by the user equipment according to the position of the at least one first PRB and the power control parameter information of the user equipment.

Optionally, as another embodiment, the power information includes power configuration information of a first user equipment and power control parameter information of the at least one first PRB, and the candidate transmit power used by the user equipment to send the first signal over each PRB of the at least one first PRB is determined by the user equipment according to a first power and a second power, where the first power is determined by the user equipment according to the position of the at least one first PRB and the power configuration information of the user equipment, and the second power is determined by the user equipment according to the position of the at least one first PRB and the power control parameter information of the at least one first PRB.

Optionally, as another embodiment, the candidate transmit power used by the user equipment to send the first signal over each PRB of at least one first PRB is a lower power between the first power and the second power.

Optionally, as another embodiment, the candidate transmit power used by the user equipment to send the first signal over each PRB of the at least one first PRB is a lowest power among the maximum transmit power supported by the user equipment, the first power, and the second power.

Optionally, as another embodiment, the power information includes power configuration information of the at least one first PRB, and the candidate transmit power used by the user equipment to send the first signal over each PRB of the at least one first PRB is a first power, where the first power is determined by the user equipment according to the position of the at least one first PRB and the power configuration information of the at least one first PRB, or the candidate transmit power used by the user equipment to send the first signal over each PRB of the at least one first PRB is a lower power between the maximum transmit power supported by the user equipment and a first power, where the first power is determined by the user equipment according to the position of the at least one first PRB and the power configuration information of the at least one first PRB.

Optionally, as another embodiment, the power information includes power control parameter information of the at least one first PRB, and the candidate transmit power used by the user equipment to send the first signal over each PRB of the at least one first PRB is a second power, where the second power is determined by the user equipment according to the position of the at least one first PRB and the power control parameter information of the at least one first PRB, or the candidate transmit power used by the user equipment to send the first signal over each PRB of the at least one first PRB is a lower power between the maximum transmit power supported by the user equipment and a second power, where the second power is determined by the user equipment according to the position of the at least one first PRB and the power control parameter information of the at least one first PRB.

Optionally, as another embodiment, the power control parameter information includes at least one of $P_O(j)$, $f(j)$, and $\alpha(j)$, where j is a position number of a PRB, $P_O(j)$ is a target receive power threshold configured by a system to receive a discovery signal over the (j)th PRB, $f(j)$ is a power control parameter and used to control a power increment value used by a user equipment to send a signal over the (j)th PRB, and $\alpha(j) \in [0,1]$ is a path loss compensation coefficient configured by the system to send a signal over the (j)th PRB.

Further, the second power is determined by the user equipment according to the following formula:

$$P(j)=(P_O(j)+\alpha(j) \cdot PL + f(j))[dBm],$$

where P(j) is a maximum transmit power used by the user equipment to send a signal over the (j)th PRB, and PL is a path loss between the base station and the user equipment.

Optionally, as another embodiment, the power configuration information includes a power corresponding to each PRB of the at least one first PRB, and the first power is determined by the user equipment according to the position of the at least one first PRB and the power corresponding to each PRB of the at least one first PRB.

Optionally, as another embodiment, the power configuration information includes a reference transmit power and an offset value corresponding to each PRB of the at least one first PRB, and the first power is determined by the user equipment according to the position of the at least one first PRB, the reference transmit power, and the offset value corresponding to each PRB of the at least one first PRB.

Optionally, as another embodiment, the power configuration information includes an offset value corresponding to each PRB of the at least one first PRB, and the first power is determined by the user equipment according to the position of the at least one first PRB, the maximum transmit power supported by the user equipment, and the offset value corresponding to each PRB of the at least one first PRB.

Alternatively, as another embodiment, the transmit power is a power less than or equal to a maximum transmit power used to send the first signal over each PRB of the at least one first PRB, the maximum transmit power used by a user equipment to send the first signal over each PRB of the at least one first PRB is determined by the user equipment according to a candidate transmit power used by the user equipment to send the first signal over each PRB of the at least one first PRB, and the candidate transmit power used by the user equipment to send the first signal over each PRB of the at least one first PRB is determined by the user equipment according to preconfigured information, where the preconfigured information indicates the candidate transmit power corresponding to each PRB of the at least one first PRB.

Alternatively, as another embodiment, the transmit power is determined by the user equipment according to the position of the at least one first PRB and power information delivered by a base station, where the power information includes the transmit power used by the user equipment to send the first signal over each PRB of the at least one first PRB.

Optionally, as another embodiment, when the at least one first PRB is one PRB, the maximum transmit power used by the user equipment to send the first signal over each PRB of the at least one first PRB is the candidate transmit power used by the user equipment to send the first signal over each PRB of the at least one first PRB.

Optionally, as another embodiment, when the at least one first PRB are at least two PRBs, the maximum transmit power used by the user equipment to send the first signal over each PRB of the at least one first PRB is determined by the user equipment according to at least one candidate transmit power used by the user equipment to send the first signal over the at least one first PRB.

Furthermore, as another embodiment, the maximum transmit power used by the user equipment to send the first signal over each PRB of the at least one first PRB is a lowest power among at least one candidate transmit power used by the user equipment to send the first signal over the at least one first PRB.

Optionally, as another embodiment, the first signal is any one of a D2D discovery signal, a D2D direct communication signal, a PUCCH signal from a user equipment to a base station, and a PUSCH signal from a user equipment to a base station.

It should be noted that the user equipment shown in FIG. 7 can implement each process that is implemented by the user equipment in the method embodiments of FIG. 1 to FIG. 5. For other functions and operations of the user equipment 700, reference may be made to the processes that are related to the user equipment in the method embodiments of FIG. 1 to FIG. 5. To avoid repetition, details are not described herein again.

Figure 8:
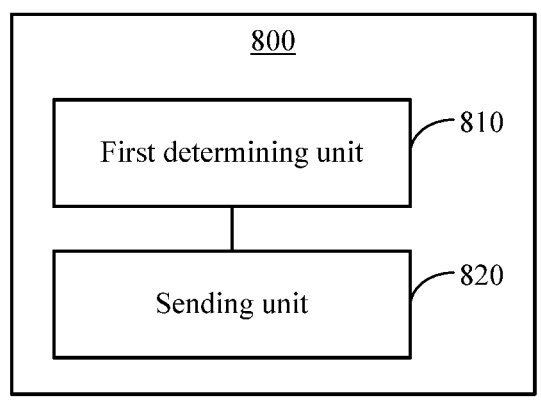
FIG. 8 is a schematic block diagram of a base station according to an embodiment of the present disclosure.

FIG. 8 is a schematic block diagram of a base station according to an embodiment of the present disclosure. A base station 800 shown in FIG. 8 includes a first determining unit 810 and a sending unit 820.

Further, the first determining unit 810 is configured to determine power information according to a position of at least one first PRB, where the power information is used to instruct a first user equipment to determine, according to the power information, a transmit power used by the first user equipment to send a first signal over the at least one first PRB, and the sending unit 820 is configured to send the power information to the first user equipment.

Therefore, the base station provided in the embodiment of the present disclosure can flexibly adjust a transmit power of a signal according to a position of a PRB, thereby improving network performance.

Optionally, as another embodiment, the power information includes at least one of power configuration information of the at least one first PRB and power control parameter information of the at least one first PRB.

Figure 9:
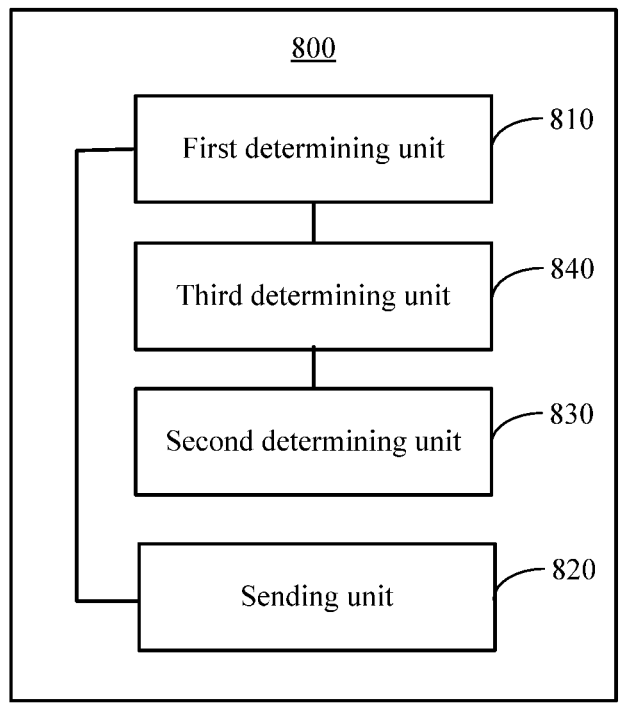
FIG. 9 is a schematic block diagram of a base station according to another embodiment of the present disclosure.

Alternatively, as another embodiment, as shown in FIG. 9, the power information includes the transmit power used by the first user equipment to send the first signal over the at least one first PRB, and the base station 800 includes a first determining unit 810, a sending unit 820, a second determining unit 830, and a third determining unit 840. The first determining unit 810 functions the same as the first determining unit 810 in FIG. 8, and the sending unit 820 functions the same as the sending unit 820 in FIG. 8. To avoid repetition, details are not described herein again. The second determining unit 830 is configured to determine, according to at least one of power configuration information of the at least one first PRB and power control parameter information of the at least one first PRB, a candidate transmit power used by the first user equipment to send the first signal over the at least one first PRB. The third determining unit 840 is configured to determine, according to the candidate transmit power used by the first user equipment to send the first signal over the at least one first PRB, a maximum transmit power used by the first user equipment to send the first signal over each PRB of the at least one first PRB. It should be noted that the second determining unit 830 and the third determining unit 840 are optional.

Optionally, as another embodiment, the candidate transmit power used by the first user equipment to send the first signal over each PRB of the at least one first PRB is determined by the base station according to a first power used by the first user equipment to send the first signal over each PRB of the at least one first PRB and a second power used by the first user equipment to send the first signal over each PRB of the at least one first PRB, where the first power is determined by the base station 800 according to the power configuration information of the at least one first PRB, and the second power is determined by the base station 800 according to the power control parameter information of the at least one first PRB.

Furthermore, as another embodiment, the candidate transmit power used by the first user equipment to send the first signal over each PRB of the at least one first PRB is a lower power between the first power and the second power.

Alternatively, as another embodiment, the candidate transmit power used by the first user equipment to send the first signal over each PRB of the at least one first PRB is a lowest power among the maximum transmit power supported by the first user equipment, the first power, and the second power.

Alternatively, as another embodiment, the candidate transmit power used by the first user equipment to send the first signal over each PRB of the at least one first PRB is a first power, where the first power is determined by the base station 800 according to the power configuration information of the at least one first PRB, or the candidate transmit power used by the first user equipment to send the first signal over each PRB of the at least one first PRB is a lower power between the maximum transmit power supported by the first user equipment and a first power, where the first power is determined by the base station 800 according to the power configuration information of the at least one first PRB.

Alternatively, as another embodiment, the candidate transmit power used by the first user equipment to send the first signal over each PRB of the at least one first PRB is a second power, where the second power is determined by the base station 800 according to the power control parameter information of the at least one first PRB, or the candidate transmit power used by the first user equipment to send the first signal over each PRB of the at least one first PRB is a lower power between the maximum transmit power supported by the first user equipment and a second power, where the second power is determined by the base station 800 according to the power control parameter information of the at least one first PRB.

Optionally, as another embodiment, the power control parameter information includes at least one of $P_O(j)$, $f(j)$, and $\alpha(j)$, where j is a position number of a PRB, $P_O(j)$ is a target receive power threshold configured by a system to receive a discovery signal over the (j)th PRB, $\alpha(j)\in[0,1]$ is a path loss compensation coefficient configured by the system to send a signal over the (j)th PRB, and $f(j)$ is a power control parameter and used to control a power increment value used by a user equipment to send a signal over the (j)th PRB.

Optionally, as another embodiment, the power configuration information includes one of the following items: a power corresponding to each PRB of the at least one first PRB, a reference transmit power and an offset value corresponding to each PRB of the at least one first PRB, and the offset value corresponding to each PRB of the at least one first PRB.

Optionally, as another embodiment, when the at least one first PRB is one PRB, the maximum transmit power used by the first user equipment to send the first signal over each PRB of the at least one first PRB is the candidate transmit power used by the first user equipment to send the first signal over each PRB of the at least one first PRB.

Optionally, as another embodiment, when the at least one first PRB are at least two PRBs, the maximum transmit power used by the first user equipment to send the first signal over each PRB of the at least one first PRB is determined by the base station 800 according to at least one candidate transmit power used by the first user equipment to send the first signal over the at least one first PRB.

Further, as another embodiment, the maximum transmit power used by the first user equipment to send the first signal over each PRB of the at least one first PRB is a lowest power among at least one candidate transmit power used by the first user equipment to send the first signal over the at least one first PRB.

Optionally, as another embodiment, the first signal is any one of a D2D discovery signal, a D2D direct communication signal, a PUCCH signal from a user equipment to a base station, and a PUSCH signal from a user equipment to a base station.

It should be noted that the base stations shown in FIG. 8 and FIG. 9 can implement each process implemented by the base station in the method embodiments of FIG. 1 to FIG. 5. For other functions and operations of the base station 800, reference may be made to the processes that are related to the base station in the method embodiments of FIG. 1 to FIG. 5. To avoid repetition, details are not described herein again.

Figure 10:
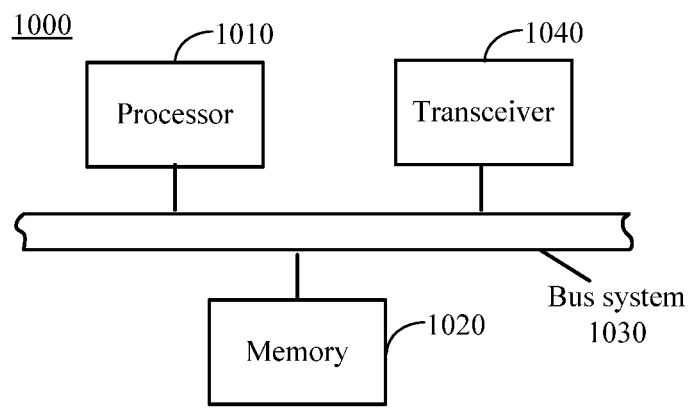
FIG. 10 is a schematic block diagram of a base station according to still another embodiment of the present disclosure.

FIG. 10 is a schematic block diagram of a base station according to another embodiment of the present disclosure. A base station 1000 shown in FIG. 10 includes a processor 1010, a memory 1020, a bus system 1030, and a transceiver 1040. The processor 1010, the memory 1020, and the transceiver 1040 are connected using the bus system 1030.

Further, the processor 1010 is configured to invoke, using the bus system 1030, code stored in the memory 1020, and determine power information according to a position of at least one first PRB, where the power information is used to instruct a first user equipment to determine, according to the power information, a transmit power used by the first user equipment to send a first signal over the at least one first PRB, and the transceiver 1040 is configured to send the power information to the first user equipment.

Therefore, the base station provided in the embodiment of the present disclosure can flexibly adjust a transmit power of a signal according to a position of a PRB, thereby improving network performance.

The method disclosed in the foregoing embodiment of the present disclosure may be applied to the processor 1010, or may be implemented by the processor 1010. The processor 1010 may be an integrated circuit chip and is capable of processing signals. In the implementation process, each step of the foregoing method may be implemented by an integrated logic circuit of hardware in the processor 1010 or using an instruction in a form of software in the processor 1010. The foregoing processor 1010 may be a general-purpose processor, DSP, an ASIC, a FPGA or another programmable logic device, a discrete gate or transistor logic device, or a discrete hardware component. The processor 1010 can implement or execute each method, step, and logic block diagram disclosed in the embodiment of the present disclosure. The general-purpose processor may be a microprocessor, or the processor may be any conventional processor or the like. The steps of the method disclosed in the embodiment of the present disclosure may be directly executed by a hardware decoding processor, or be executed using a combination of a hardware module and a software module in a decoding processor. The software module may be located in a mature storage medium in the prior art, such as a RAM, a flash memory, a ROM, a programmable read-only memory, an electrically erasable programmable memory, or a register. The storage medium is located in the memory 1020. The processor 1010 reads information in the memory 1020, and implements the steps of the foregoing method in combination with hardware of the processor 1010. In addition to a data bus, the bus system 1030 may further include a power bus, a control bus, a status signal bus, and the like. However, for clarity, different types of buses are collectively marked as the bus system 1030 in the figure.

Optionally, as another embodiment, the power information includes at least one of power configuration information of the at least one first PRB and power control parameter information of the at least one first PRB.

Alternatively, as another embodiment, the power information includes the transmit power used by the first user equipment to send the first signal over the at least one first PRB. The processor 1010 is further configured to determine, according to at least one of the power configuration information of the at least one first PRB and the power control parameter information of the at least one first PRB, a candidate transmit power used by the first user equipment to send the first signal over the at least one first PRB, and the processor 1010 is further configured to determine, according to the candidate transmit power used by the first user equipment to send the first signal over the at least one first PRB, a maximum transmit power used by the first user equipment to send the first signal over each PRB of the at least one first PRB.

Optionally, as another embodiment, the candidate transmit power used by the first user equipment to send the first signal over each PRB of the at least one first PRB is determined by the base station 1000 according to a first power used by the first user equipment to send the first signal over each PRB of the at least one first PRB and a second power used by the first user equipment to send the first signal over each PRB of the at least one first PRB, where the first power is determined by the base station 1000 according to the power configuration information of the at least one first PRB, and the second power is determined by the base station 1000 according to the power control parameter information of the at least one first PRB.

Further, as another embodiment, the candidate transmit power used by the first user equipment to send the first signal over each PRB of the at least one first PRB is a lower power between the first power and the second power.

Alternatively, as another embodiment, the candidate transmit power used by the first user equipment to send the first signal over each PRB of the at least one first PRB is a lowest power among the maximum transmit power supported by the first user equipment, the first power, and the second power.

Alternatively, as another embodiment, the candidate transmit power used by the first user equipment to send the first signal over each PRB of the at least one first PRB is a first power, where the first power is determined by the base station 1000 according to the power configuration information of the at least one first PRB, or the candidate transmit power used by the first user equipment to send the first signal over each PRB of the at least one first PRB is a lower power between the maximum transmit power supported by the first user equipment and a first power, where the first power is determined by the base station 1000 according to the power configuration information of the at least one first PRB.

Alternatively, as another embodiment, the candidate transmit power used by the first user equipment to send the first signal over each PRB of the at least one first PRB is a second power, where the second power is determined by the base station 1000 according to the power control parameter information of the at least one first PRB or the candidate transmit power used by the first user equipment to send the first signal over each PRB of the at least one first PRB is a lower power between the maximum transmit power supported by the first user equipment and a first power, where the second power is determined by the base station 1000 according to the power control parameter information of the at least one first PRB.

Alternatively, as another embodiment, the power control parameter information includes at least one of $P_O(j)$, $f(j)$, and α(j), where j is a position number of a PRB, $P_O(j)$ is a target receive power threshold configured by a system to receive a discovery signal over PRB (j), $\alpha(j)\in[0,1]$ is a path loss compensation coefficient configured by the system to send a signal over PRB (j), and f(j) is a power control parameter and used to control a power increment value used by a user equipment to send a signal over PRB(j).

Optionally, as another embodiment, the power configuration information includes one of the following items: a power corresponding to each PRB of the at least one first PRB, a reference transmit power and an offset value corresponding to each PRB of the at least one first PRB, and the offset value corresponding to each PRB of the at least one first PRB.

Optionally, as another embodiment, when the at least one first PRB is one PRB, the maximum transmit power used by the first user equipment to send the first signal over each PRB of the at least one first PRB is the candidate transmit power used by the first user equipment to send the first signal over each PRB of the at least one first PRB.

Optionally, as another embodiment, when the at least one first PRB are at least two PRBs, the maximum transmit power used by the first user equipment to send the first signal over each PRB of the at least one first PRB is determined by the base station 1000 according to at least one candidate transmit power used by the first user equipment to send the first signal over the at least one first PRB.

Further, as another embodiment, the maximum transmit power used by the first user equipment to send the first signal over each PRB of the at least one first PRB is a lowest power among at least one candidate transmit power used by the first user equipment to send the first signal over the at least one first PRB.

Optionally, as another embodiment, the first signal is any one of a D2D discovery signal, a D2D direct communication signal, a PUCCH signal from a user equipment to a base station, and a PUSCH signal from a user equipment to a base station.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the present disclosure. The foregoing storage medium includes any medium that can store program code, such as an universal serial bus (USB) flash drive, a removable hard disk, a ROM, a RAM, a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A signal sending method, comprising:
   determining, by a user equipment, a physical resource block (PRB) used to send a signal;
   determining, by the user equipment, a position of the PRB;
   receiving, by the user equipment from a base station, power information comprising power configuration information of the PRB and power control parameter information of the PRB;

determining, by the user equipment, a first power based on the position of the PRB and the power configuration information;

determining, by the user equipment, a second power based on the position of the PRB and the control parameter information;

determining, by the user equipment, a lowest power among the first power, the second power, and a maximum transmit power supported by the user equipment;

setting, by the user equipment, a transmit power of the PRB to the lowest power; and sending, by the user equipment, the signal over the PRB using the transmit power, wherein the power configuration information comprises a reference transmit power and an offset value corresponding to the PRB, and wherein the first power is determined based on the position of the PRB, the reference transmit power, and the offset value corresponding to the PRB according to the formula:

first power=reference transmit power−Poffset($j$)

wherein Poffset(j) is a offset power for the (j)th PRB, wherein the power control parameter information comprises at least one of: $P_O(j)$, f(j), and $\alpha(j)$, wherein j is a position number of a (j)th PRB, wherein $P_O(j)$ is a target receive power threshold configured by a system to receive a discovery signal over the (j)th PRB, wherein f(j) is used to control a power increment value to send the signal over the (j)th PRB, and wherein the $\alpha(j) \in [0,1]$ is a path loss compensation coefficient configured by the system to send the signal over the (j)th PRB, wherein the second power is determined according to the formula:

$P(j)=(P_O(j)+\alpha(j) \cdot PL+f(j))$[dBm], wherein P(j) is a maximum transmit power to send the signal over the (j)th PRB, and wherein PL is a path loss between the base station and the user equipment.

2. The method of claim 1, wherein the signal is any one of a device-to-device (D2D) discovery signal, a D2D direct communication signal, a physical uplink control channel (PUCCH) signal, and a physical uplink shared channel (PUSCH) signal.

3. A user equipment comprising:
a memory; and
a processor coupled to the memory, the processor configured to:

determine a physical resource block (PRB) used to send a signal;

determine a position of the PRB;

receive, from a base station, power information comprising power configuration information of the PRB and power control parameter information of the PRB;

determine a first power based on the position of the PRB and the power configuration information;

determine a second power based on the position of the PRB and the power control parameter information;

determine a lowest power among the first power, the second power, and a maximum transmit power supported by the user equipment;

set a transmit power of the PRB to the lowest power; and send the signal over the PRB using the transmit power, wherein the power configuration information comprises a reference transmit power and an offset value corresponding the PRB, and wherein the first power is determined based on the position of the PRB, the reference transmit power, and the offset value corresponding to the PRB according to the formula:

first power=reference transmit power−Poffset($j$)

wherein Poffset(j) is a offset power for the (j)th PRB, wherein the control parameter information comprises at least one of: $P_O(j)$, f(j), and $\alpha(j)$, wherein j is a position number of a (j)th PRB, wherein $P_O(j)$ is a target receive power threshold configured by a system to receive a discovery signal over the (j)th PRB, wherein f(j) is used to control a power increment value to send the signal over the (j)th PRB, and wherein the $\alpha(j) \in [0,1]$ is a path loss compensation coefficient configured by the system to send the signal over the (j)th PRB, wherein the second power is determined according to the formula:

$P(j)=(P_O(j)+\alpha(j) \cdot PL+f(j))$[dBm], wherein P(j) is a maximum transmit power to send the signal over the (j)th PRB, and wherein PL is a path loss between the base station and the user equipment.

4. The method of claim 3, wherein the signal is any one of a device-to-device (D2D) discovery signal, a D2D direct communication signal, a physical uplink control channel (PUCCH) signal, and a physical uplink shared channel (PUSCH) signal.

* * * * *